(12) United States Patent
Abedini et al.

(10) Patent No.: US 11,956,795 B2
(45) Date of Patent: Apr. 9, 2024

(54) TECHNIQUES FOR FORWARDING AN UNSCHEDULED COMMUNICATION

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/387,604

(22) Filed: Jul. 28, 2021

(65) Prior Publication Data

US 2022/0046695 A1 Feb. 10, 2022

Related U.S. Application Data

(60) Provisional application No. 62/706,181, filed on Aug. 4, 2020.

(51) Int. Cl.
*H04W 72/23* (2023.01)
*H04B 7/155* (2006.01)

(52) U.S. Cl.
CPC .......... *H04W 72/23* (2023.01); *H04B 7/155* (2013.01)

(58) Field of Classification Search
CPC ............................... H04W 72/14; H04B 7/155
See application file for complete search history.

(56) References Cited

U.S. PATENT DOCUMENTS

| | | | | |
|---|---|---|---|---|
| 10,673,577 B2* | 6/2020 | Aijaz | ..................... | H04L 1/1854 |
| 11,012,141 B1* | 5/2021 | Parihar | ................. | H04L 5/0048 |
| 2007/0275657 A1* | 11/2007 | Chang | ................... | H04L 1/1854 |
| | | | | 455/9 |
| 2011/0122933 A1* | 5/2011 | Adam | ................ | H04B 7/15592 |
| | | | | 375/219 |
| 2013/0214909 A1* | 8/2013 | Meijers | ................. | H04W 4/029 |
| | | | | 340/10.5 |
| 2013/0286930 A1* | 10/2013 | Nagata | ............... | H04B 7/15542 |
| | | | | 370/315 |

(Continued)

FOREIGN PATENT DOCUMENTS

EP 1863211 A2 12/2007

OTHER PUBLICATIONS

International Search Report and Written Opinion—PCT/US2021/071041—ISA/EPO—dated Dec. 1, 2021.

(Continued)

*Primary Examiner* — Christopher M Crutchfield
*Assistant Examiner* — Tito Q Pham
(74) *Attorney, Agent, or Firm* — Dalei Dong; Harrity & Harrity, LLP

(57) ABSTRACT

Various aspects of the present disclosure generally relate to wireless communication. In some aspects, a forwarding node may receive, from a first wireless communication device and during a receipt occasion, an unscheduled communication for forwarding to a second wireless communication device or a control node. The forwarding node may transmit, to the second wireless communication device or the control node and based at least in part on receiving the unscheduled communication during the receipt occasion, an indication of receipt of the unscheduled communication. Numerous other aspects are provided.

30 Claims, 14 Drawing Sheets

(56) References Cited

U.S. PATENT DOCUMENTS

| | | | | |
|---|---|---|---|---|
| 2014/0354451 A1* | 12/2014 | Tonguz | ............ | G08G 1/096791 |
| | | | | 340/905 |
| 2016/0112127 A1* | 4/2016 | Zhi | ...................... | H04B 10/116 |
| | | | | 398/118 |
| 2017/0142653 A1* | 5/2017 | Qi | ........................ | H04B 7/2606 |
| 2017/0337540 A1* | 11/2017 | Buckman | ........... | G06Q 20/3223 |
| 2019/0149957 A1* | 5/2019 | Raza | ................... | H04W 40/023 |
| | | | | 370/312 |
| 2020/0008030 A1* | 1/2020 | Kim | ...................... | H04W 72/23 |
| 2020/0036483 A1* | 1/2020 | Aijaz | .................... | H04L 1/1874 |
| 2020/0092685 A1* | 3/2020 | Fehrenbach | .......... | H04W 36/18 |
| 2020/0136733 A1* | 4/2020 | Hassan Hussein | ... | H04W 76/14 |
| 2020/0374832 A1* | 11/2020 | Yang | .................. | H04W 68/005 |
| 2021/0127396 A1* | 4/2021 | Su | ......................... | H04L 5/0094 |
| 2022/0376787 A1* | 11/2022 | Lee | ..................... | H04B 10/112 |

OTHER PUBLICATIONS

Qualcomm Europe: "Preference for Relay Operation in LTE-A," 3GPP TSG-RAN WG3 #64, R3-091023, 3rd Generation Partnership Project (3GPP), Mobile Competence Centre, 650, Route Des Lucioles, F-06921, Sophia-Antipolis Cedex, France, No. San Francisco, USA, May 4-May 8, 2009, Apr. 29, 2009 (Apr. 29, 2009), XP050341408, 9 pages, [retrieved on Apr. 29, 2009], the whole document.

\* cited by examiner

TECHNIQUES FOR FORWARDING AN UNSCHEDULED COMMUNICATION

CROSS-REFERENCE TO RELATED APPLICATION

This Patent Application claims priority to U.S. Provisional Patent Application No. 62/706,181, filed on Aug. 4, 2020, entitled "TECHNIQUES FOR FORWARDING AN UNSCHEDULED COMMUNICATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for forwarding an unscheduled communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a forwarding node includes: receiving, from a first wireless communication device and during a receipt occasion, an unscheduled communication for forwarding to a second wireless communication device or a control node; and transmitting, to the second wireless communication device or the control node and based at least in part on receiving the unscheduled communication during the receipt occasion, an indication of receipt of the unscheduled communication.

In some aspects, the method includes transmitting, to the second wireless communication device or the control node, a regeneration of the unscheduled communication, or transmitting, to the second wireless communication device or the control node, a communication that is based at least in part on the unscheduled communication.

In some aspects, the method includes receiving, from one or more additional wireless communication devices and during one or more additional receipt occasions, one or more additional unscheduled communications for forwarding to the second wireless communication device; and transmitting, to the second wireless communication device or the control node, regenerations of the unscheduled communication and the one or more additional unscheduled communications or one or more communications that are based at least in part on the unscheduled communication and the one or more additional unscheduled communications.

In some aspects, the method includes receiving a new resource grant, an indication to modify a configuration of a configured resource grant, or an indication to modify a transmission configuration based at least in part on transmission of the indication of receipt of the unscheduled communication.

In some aspects, transmission of the indication of receipt of the unscheduled communication comprises one or more of: transmission of the indication of receipt of the unscheduled communication via one or more resources associated with multiple receipt occasions, or transmission of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with monitoring the receipt occasion a measurement report, or a detection report.

In some aspects, the unscheduled communication comprises: a scheduling request, a configured grant communication, a control channel communication, a paging communication, or a random access channel (RACH) communication.

In some aspects, reception of the unscheduled communication comprises: monitoring the receipt occasion to determine whether the first wireless communication device transmitted the unscheduled communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a method of wireless communication performed by a control node includes: receiving, from a forwarding node, an indication of receipt of an unscheduled communication from a first wireless communication device, the unscheduled communication for forwarding to a second wireless communication device or the control node; and transmitting, to the forwarding node, a configuration for forwarding the unscheduled communication to the second wireless communication device or the control node.

In some aspects, the method includes transmitting, to the second wireless communication device, a configuration for reception of the unscheduled communication from the forwarding node.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the method includes receiving, from the forwarding node, a regeneration of the unscheduled communication, or receiving, from the forwarding node, a communication that is based at least in part on the unscheduled communication.

In some aspects, the method comprises one or more of: receiving, from the forwarding node, regenerations of the unscheduled communication and one or more additional unscheduled communications; or receiving one or more communications that are based at least in part on the unscheduled communication and the one or more additional unscheduled communications.

In some aspects, the method includes transmitting, to the forwarding node and based at least in part on reception of the indication of receipt of the unscheduled communication, one or more of: a new resource grant, an indication to modify a configuration of a configured resource grant, or an indication to modify a transmission configuration.

In some aspects, reception of the indication of receipt of the unscheduled communication comprises one or more of: reception of the indication of receipt of the unscheduled communication via one or more resources associated with multiple receipt occasions, or reception of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, or an indication of one or more parameters associated with the forwarding node monitoring a receipt occasion associated with the unscheduled communication, a measurement report, or a detection report.

In some aspects, the unscheduled communication comprises: a scheduling request, a configured grant communication, a control channel communication, a paging communication, or a RACH communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a method of wireless communication performed by a wireless communication device includes: receiving, from a control node, a configuration for reception of an unscheduled communication from a forwarding node; and receiving, from the forwarding node, the unscheduled communication.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the method includes receiving, from the forwarding node, a regeneration of the unscheduled communication, or receiving, from the forwarding node, a communication that is based at least in part on the unscheduled communication.

In some aspects, the method includes one or more of: receiving, from the forwarding node, regenerations of the unscheduled communication and one or more additional unscheduled communications; or receiving one or more communications that are based at least in part on the unscheduled communication and the one or more additional unscheduled communications.

In some aspects, the unscheduled communication comprises: a scheduling request, a configured grant communication, a control channel communication, a paging communication, or a RACH communication.

In some aspects, one or more of: the forwarding node comprises a repeater node or a relay node, the wireless communication the second wireless communication device comprises a base station, an integrated access backhaul node, or a UE, or the control node comprises a base station or an integrated access backhaul node.

In some aspects, a forwarding node for wireless communication includes a memory and one or more processors coupled to the memory, the memory and the one or more processors configured to: receive, from a first wireless communication device and during a receipt occasion, an unscheduled communication for forwarding to a second wireless communication device or a control node; and transmit, to the second wireless communication device or the control node and based at least in part on receiving the unscheduled communication during the receipt occasion, an indication of receipt of the unscheduled communication.

In some aspects, the one or more processors are further configured to: transmit, to the second wireless communication device or the control node, a regeneration of the unscheduled communication, or transmit, to the second wireless communication device or the control node, a communication that is based at least in part on the unscheduled communication.

In some aspects, the one or more processors are further configured to: receive, from one or more additional wireless communication devices and during one or more additional receipt occasions, one or more additional unscheduled communications for forwarding to the second wireless communication device; and transmit, to the second wireless communication device or the control node, regenerations of the unscheduled communication and the one or more additional unscheduled communications or one or more communications that are based at least in part on the unscheduled communication and the one or more additional unscheduled communications.

In some aspects, the one or more processors are further configured to: receive a new resource grant, an indication to modify a configuration of a configured resource grant, or an indication to modify a transmission configuration based at least in part on transmission of the indication of receipt of the unscheduled communication.

In some aspects, transmission of the indication of receipt of the unscheduled communication comprises one or more of: transmission of the indication of receipt of the unscheduled communication via one or more resources associated with multiple receipt occasions, or transmission of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with monitoring of the receipt occasion a measurement report, or a detection report.

In some aspects, the unscheduled communication comprises: a scheduling request, a configured grant communication, a control channel communication, a paging communication, or a RACH communication.

In some aspects, reception of the unscheduled communication comprises monitoring of the receipt occasion to determine whether the first wireless communication device transmitted the unscheduled communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a control node for wireless communication includes: a memory; and one or more processors coupled to the memory, the memory and the one or more processors configured to: receive, from a forwarding node, an indication of receipt of an unscheduled communication from a first wireless communication device, the unscheduled communication for forwarding to a second wireless communication device or the control node; and transmit, to the forwarding node, a configuration for forwarding the unscheduled communication to the second wireless communication device or the control node.

In some aspects, the one or more processors are further configured to transmit, to the second wireless communication device, a configuration for reception of the unscheduled communication from the forwarding node.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the one or more processors are further configured to: receive, from the forwarding node, a regeneration of the unscheduled communication, or receive, from the forwarding node, a communication that is based at least in part on the unscheduled communication.

In some aspects, the one or more processors are further configured to perform one or more of: reception of, from the forwarding node, regenerations of the unscheduled communication and one or more additional unscheduled communications; or reception of one or more communications that are based at least in part on the unscheduled communication and the one or more additional unscheduled communications.

In some aspects, the one or more processors are further configured to transmit, to the forwarding node and based at least in part on reception of the indication of receipt of the unscheduled communication, one or more of: a new resource grant, an indication to modify a configuration of a configured resource grant, or an indication to modify a transmission configuration.

In some aspects, reception of the indication of receipt of the unscheduled communication comprises one or more of: reception of the indication of receipt of the unscheduled communication via one or more resources associated with multiple receipt occasions, or reception of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with the forwarding node monitoring a receipt occasion associated with the unscheduled communication, a measurement report, or a detection report.

In some aspects, the unscheduled communication comprises: a scheduling request, a configured grant communication, a control channel communication, a paging communication, or a RACH communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a wireless communication device for wireless communication includes a memory and one or more processors coupled to the memory, the memory and the one or more processors configured to: receive, from a control node, a configuration for reception of an unscheduled communication from a forwarding node; and receive, from the forwarding node, the unscheduled communication.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the one or more processors are further configured to: receive, from the forwarding node, a regeneration of the unscheduled communication, or receive, from the forwarding node, a communication that is based at least in part on the unscheduled communication.

In some aspects, the one or more processors are further configured to perform one or more of: reception of, from the forwarding node, regenerations of the unscheduled communication and one or more additional unscheduled communications; or reception of one or more communications that are based at least in part on the unscheduled communication and the one or more additional unscheduled communications.

In some aspects, the unscheduled communication comprises: a scheduling request, a configured grant communication, a control channel communication, a paging communication, or a RACH communication.

In some aspects, one or more of: the forwarding node comprises a repeater node or a relay node, the wireless communication the second wireless communication device comprises a base station, an integrated access backhaul node, or a UE, or the control node comprises a base station or an integrated access backhaul node.

In some aspects, a non-transitory computer-readable medium storing a set of instructions for wireless communication includes one or more instructions that, when executed by one or more processors of a forwarding node, cause the forwarding node to: receive, from a first wireless communication device and during a receipt occasion, an unscheduled communication for forwarding to a second wireless communication device or a control node; and transmit, to the second wireless communication device or the control node and based at least in part on receiving the unscheduled communication during the receipt occasion, an indication of receipt of the unscheduled communication.

In some aspects, the one or more instructions further cause the forwarding node to: transmit, to the second wireless communication device or the control node, a regeneration of the unscheduled communication, or transmit, to the second wireless communication device or the control node, a communication that is based at least in part on the unscheduled communication.

In some aspects, the one or more instructions further cause the forwarding node to: receive, from one or more additional wireless communication devices and during one or more additional receipt occasions, one or more additional unscheduled communications for forwarding to the second wireless communication device; and transmit, to the second wireless communication device or the control node, regenerations of the unscheduled communication and the one or more additional unscheduled communications or one or more communications that are based at least in part on the unscheduled communication and the one or more additional unscheduled communications.

In some aspects, the one or more instructions further cause the forwarding node to receive: a new resource grant, an indication to modify a configuration of a configured resource grant, or an indication to modify a transmission configuration based at least in part on transmission of the indication of receipt of the unscheduled communication.

In some aspects, transmission of the indication of receipt of the unscheduled communication comprises one or more of: transmission of the indication of receipt of the unscheduled communication via one or more resources associated with multiple receipt occasions, or transmission of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with monitoring of the receipt occasion, a measurement report, or a detection report.

In some aspects, the unscheduled communication comprises: a scheduling request, a configured grant communication, a control channel communication, a paging communication, or a RACH communication.

In some aspects, reception of the unscheduled communication comprises monitoring of the receipt occasion to determine whether the first wireless communication device transmitted the unscheduled communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a non-transitory computer-readable medium storing a set of instructions for wireless communication includes one or more instructions that, when executed by one or more processors of a control node, cause the control node to: receive, from a forwarding node, an indication of receipt of an unscheduled communication from a first wireless communication device, the unscheduled communication for forwarding to a second wireless communication device or the control node; and transmit, to the forwarding node, a configuration for forwarding the unscheduled communication to the second wireless communication device or the control node.

In some aspects, the one or more instructions further cause the control node to transmit, to the second wireless communication device, a configuration for reception of the unscheduled communication from the forwarding node.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the one or more instructions further cause the control node to: receive, from the forwarding node, a regeneration of the unscheduled communication, or receive, from the forwarding node, a communication that is based at least in part on the unscheduled communication.

In some aspects, the one or more instructions further cause the control node to one or more of: receive, from the forwarding node, regenerations of the unscheduled communication and one or more additional unscheduled communications; or receive one or more communications that are based at least in part on the unscheduled communication and the one or more additional unscheduled communications.

In some aspects, the one or more instructions further cause the control node to transmit, to the forwarding node and based at least in part on reception of the indication of receipt of the unscheduled communication, one or more of: a new resource grant, an indication to modify a configuration of a configured resource grant, or an indication to modify a transmission configuration.

In some aspects, reception of the indication of receipt of the unscheduled communication comprises one or more of: reception of the indication of receipt of the unscheduled communication via one or more resources associated with multiple receipt occasions, or reception of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with the forwarding node monitoring a receipt occasion associated with the unscheduled communication, a measurement report, or a detection report.

In some aspects, the unscheduled communication comprises: a scheduling request, a configured grant communication, a control channel communication, a paging communication, or a RACH communication.

In some aspects, one or more of: the forwarding node comprises a repeater node or a relay node, the second wireless communication the second wireless communication device comprises a base station, an integrated access backhaul node, or a UE, or the control node comprises the second wireless communication device.

In some aspects, a non-transitory computer-readable medium storing a set of instructions for wireless communication includes one or more instructions that, when executed by one or more processors of a wireless communication device, cause the wireless communication device to: receive, from a control node, a configuration for reception of an unscheduled communication from a forwarding node; and receive, from the forwarding node, the unscheduled communication.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the one or more instructions further cause the wireless communication device to: receive, from the forwarding node, a regeneration of the unscheduled communication, or receive, from the forwarding node, a communication that is based at least in part on the unscheduled communication.

In some aspects, the one or more instructions further cause the wireless communication device to perform one or more of: reception of, from the forwarding node, regenerations of the unscheduled communication and one or more additional unscheduled communications; or reception of one or more communications that are based at least in part on the unscheduled communication and the one or more additional unscheduled communications.

In some aspects, the unscheduled communication comprises: a scheduling request, a configured grant communication, a control channel communication, a paging communication, or a RACH communication.

In some aspects, one or more of: the forwarding node comprises a repeater node or a relay node, the wireless communication the second wireless communication device comprises a base station, an integrated access backhaul node, or a UE, or the control node comprises a base station or an integrated access backhaul node.

In some aspects, an apparatus for wireless communication includes: means for receiving, from a first wireless communication device and during a receipt occasion, an unscheduled communication for forwarding to a second wireless communication device or a control node; and means for transmitting, to the second wireless communication device or the control node and based at least in part on receiving the unscheduled communication during the receipt occasion, an indication of receipt of the unscheduled communication.

In some aspects, the method includes means for transmitting, to the second wireless communication device or the control node, a regeneration of the unscheduled communication, or means for transmitting, to the second wireless communication device or the control node, a communication that is based at least in part on the unscheduled communication.

In some aspects, the method includes means for receiving, from one or more additional wireless communication devices and during one or more additional receipt occasions, one or more additional unscheduled communications for forwarding to the second wireless communication device; and means for transmitting, to the second wireless communication device or the control node, regenerations of the unscheduled communication and the one or more additional unscheduled communications or one or more communications that are based at least in part on the unscheduled communication and the one or more additional unscheduled communications.

In some aspects, the method includes means for receiving a new resource grant, an indication to modify a configuration of a configured resource grant, or an indication to modify a transmission configuration based at least in part on transmission of the indication of receipt of the unscheduled communication.

In some aspects, transmission of the indication of receipt of the unscheduled communication comprises one or more of: transmission of the indication of receipt of the unscheduled communication via one or more resources associated with multiple receipt occasions, or transmission of the indication of receipt of the unscheduled communication via one or more resources of a configured grant.

In some aspects, the indication of receipt of the unscheduled communication comprises one or more of: a scheduling request, an indication of a number of receipt occasions on which the apparatus received unscheduled communications including the unscheduled communication, an indication of one or more parameters associated with monitoring of the receipt occasion, a measurement report, or a detection report.

In some aspects, the unscheduled communication comprises: a scheduling request, a configured grant communication, a control channel communication, a paging communication, or a RACH communication.

In some aspects, reception of the unscheduled communication comprises means for monitoring the receipt occasion to determine whether the first wireless communication device transmitted the unscheduled communication.

In some aspects, one or more of: the apparatus comprises a repeater node or a relay node, the second wireless communication the second wireless communication device comprises a base station, an integrated access backhaul node, or a UE, or the control node comprises the second wireless communication device.

In some aspects, an apparatus for wireless communication includes: means for receiving, from a forwarding node, an indication of receipt of an unscheduled communication from a first wireless communication device, the unscheduled communication for forwarding to a second wireless communication device or the apparatus; and means for transmitting, to the forwarding node, a configuration for forwarding the unscheduled communication to the second wireless communication device or the apparatus.

In some aspects, the method includes means for transmitting, to the second wireless communication device, a configuration for reception of the unscheduled communication from the forwarding node.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the method includes means for receiving, from the forwarding node, a regeneration of the unscheduled communication, or means for receiving, from the forwarding node, a communication that is based at least in part on the unscheduled communication.

In some aspects, the method includes one or more of: means for receiving, from the forwarding node, regenerations of the unscheduled communication and one or more additional unscheduled communications; or means for receiving one or more communications that are based at least in part on the unscheduled communication and the one or more additional unscheduled communications In some aspects, the method includes means for transmitting, to the forwarding node and based at least in part on reception of the indication of receipt of the unscheduled communication, one or more of: a new resource grant, an indication to modify a configuration of a configured resource grant, or an indication to modify a transmission configuration.

In some aspects, reception of the indication of receipt of the unscheduled communication comprises one or more of: reception of the indication of receipt of the unscheduled communication via one or more resources associated with multiple receipt occasions, or reception of the indication of receipt of the unscheduled communication via one or more resources of a configured grant.

In some aspects, the indication of receipt of the unscheduled communication comprises one or more of: a scheduling request, an indication of a number of receipt occasions on which the forwarding node received unscheduled communications including the unscheduled communication, an indication of one or more parameters associated with the forwarding node monitoring a receipt occasion associated with the unscheduled communication, a measurement report, or a detection report.

In some aspects, the unscheduled communication comprises: a scheduling request, a configured grant communication, a control channel communication, a paging communication, or a RACH communication.

In some aspects, one or more of: the forwarding node comprises a repeater node or a relay node, the second wireless communication the second wireless communication device comprises a base station, an integrated access backhaul node, or a UE, or the apparatus comprises the second wireless communication device.

In some aspects, an apparatus for wireless communication includes: means for receiving, from a control node, a configuration for reception of an unscheduled communication from a forwarding node; and means for receiving, from the forwarding node, the unscheduled communication.

In some aspects, the configuration for reception of the unscheduled communication from the forwarding node comprises one or more of: an indication to receive the unscheduled communication via an indicated resource, or an indication to receive the unscheduled communication via a configured resource.

In some aspects, the method includes means for receiving, from the forwarding node, a regeneration of the unscheduled communication, or means for receiving, from the forwarding node, a communication that is based at least in part on the unscheduled communication.

In some aspects, the method includes one or more of: means for receiving, from the forwarding node, regenerations of the unscheduled communication and one or more additional unscheduled communications; or means for receiving one or more communications that are based at least in part on the unscheduled communication and the one or more additional unscheduled communications.

In some aspects, the unscheduled communication comprises: a scheduling request, a configured grant communication, a control channel communication, a paging communication, or a RACH communication.

In some aspects, one or more of: the forwarding node comprises a repeater node or a relay node, the apparatus comprises a base station or an integrated access backhaul node, or the control node comprises a base station or an integrated access backhaul node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
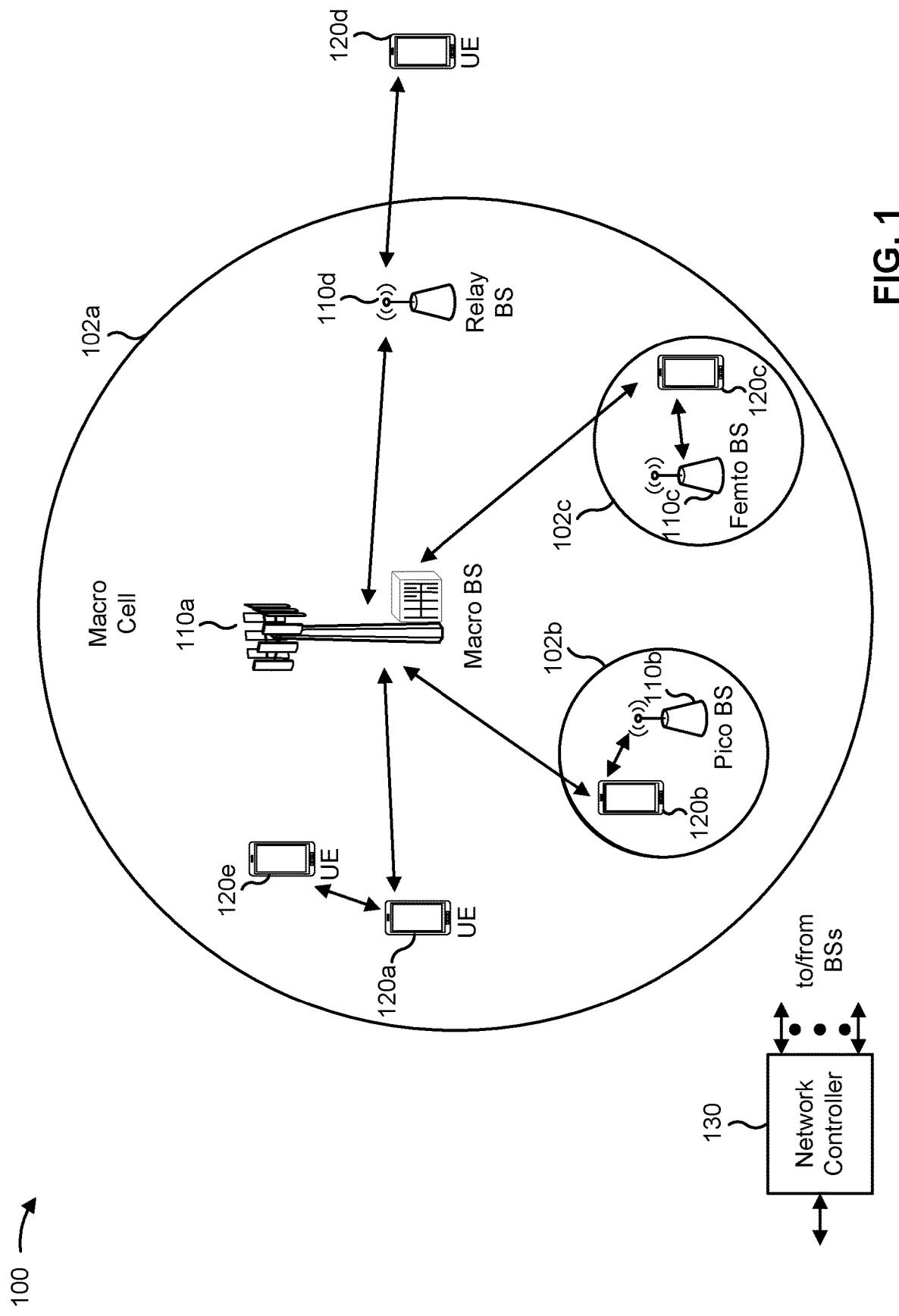
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
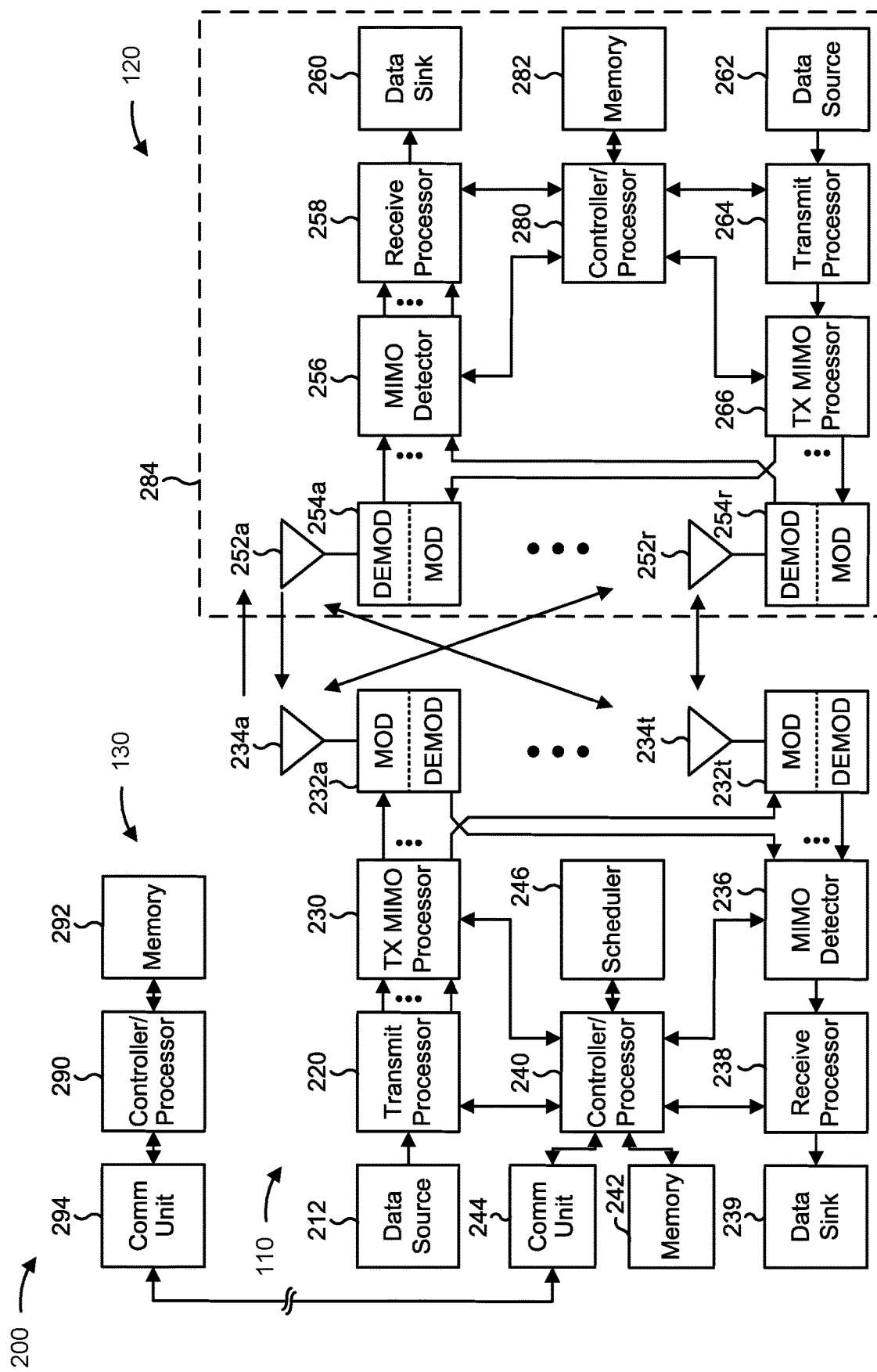
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with forwarding an unscheduled communication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions.

In some aspects, a repeater node (e.g., a base station 110) may include means for receiving, from a first wireless communication device and during a receipt occasion, an unscheduled communication for forwarding to a second wireless communication device or a control node; means for transmitting, to the second wireless communication device or the control node and based at least in part on receiving the unscheduled communication during the receipt occasion, an indication of receipt of the unscheduled communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., a base station 110) may include means for receiving, from a forwarding node, an indication of receipt of an unscheduled communication from a first wireless communication device, the unscheduled communication for forwarding to a second wireless communication device or the control node; means for transmitting, to the forwarding node, a configuration for forwarding the unscheduled communication to the second wireless communication device or the control node; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device (e.g., a base station 110) may include means for receiving, from a control node, a configuration for reception of an unscheduled communication from a forwarding node; means for receiving, from the forwarding node, the unscheduled communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
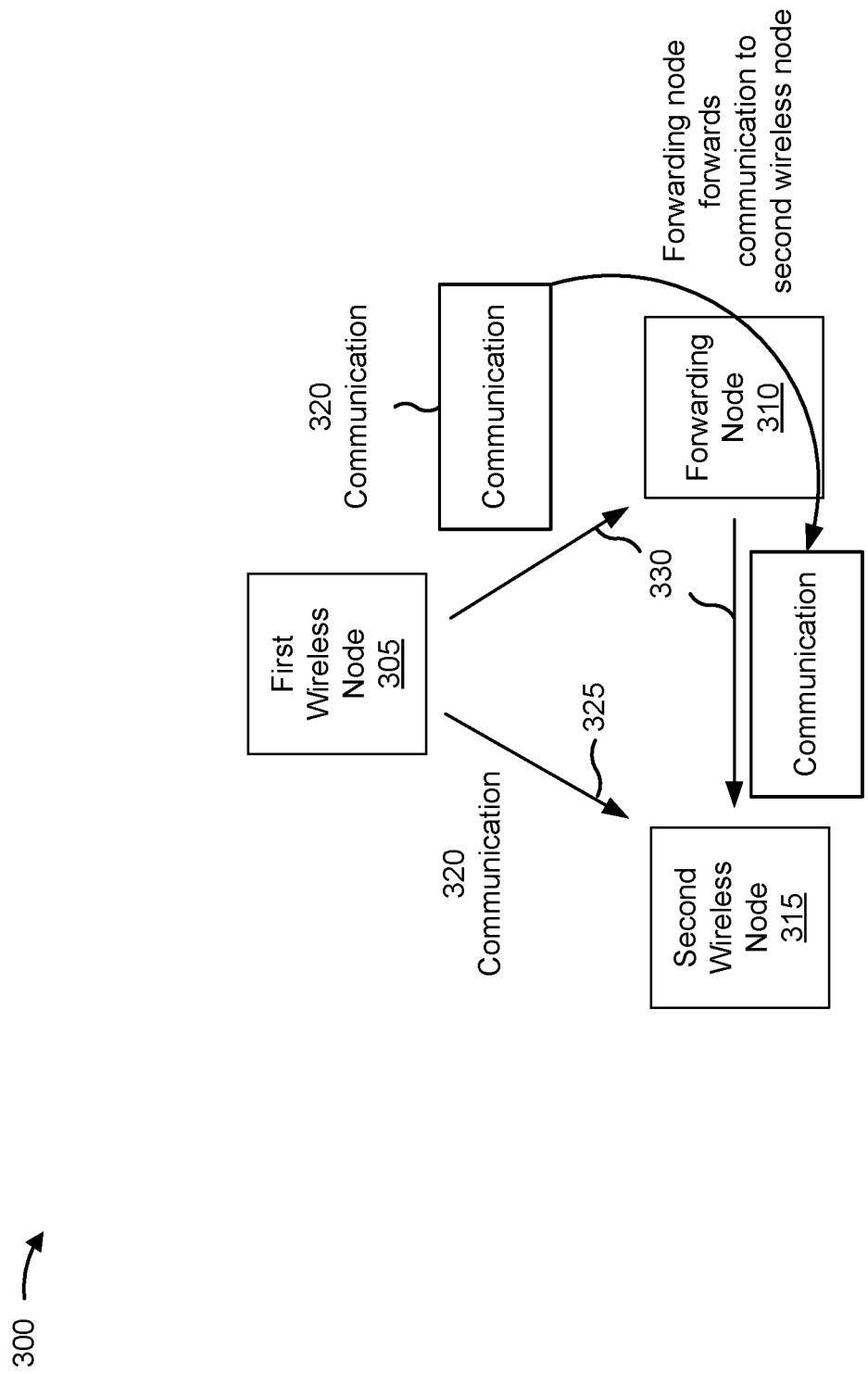
FIG. 3 is a diagram illustrating an example of a repeater node that forwards communications between a first wireless node and a second wireless node, in accordance with the present disclosure.

FIG. 3 is a diagram illustrating an example 300 of a forwarding node (e.g., a repeater node or a relay node) that forwards communications between a first wireless node and a second wireless node, in accordance with the present disclosure. As shown, example 300 includes a first wireless node 305 (e.g., an integrated access and backhaul (IAB) node, an IAB donor, a base station 110, and UE 120, and/or the like), a forwarding node 310 (e.g., a repeater device, a base station 110, a UE 120, a millimeter wave repeater, a digital repeater, an analog repeater, and/or the like), and a second wireless node 315 (e.g., an IAB node, an IAB donor, a base station 110, and UE 120, another forwarding node 310, and/or the like). In example 300, the first wireless node 305 and/or a second wireless node may be aware of the forwarding node 310. In some aspects, the first wireless node 305 and/or a second wireless node may be unaware of the forwarding node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the forwarding node 310. In some aspects, the first wireless node 305 may transmit the communication 320 directly to the forwarding node 310 (e.g., when the first wireless node 305 is aware of the forwarding node 310). In some aspects, the forwarding node 310 may be configured (e.g., by a control node, by the second wireless node 315, and/or the like) to receive the communication 320 from the first wireless node 305 (e.g., when the first wireless node 305 is unaware of the forwarding node 310).

As shown in FIG. 3, the communication 320 may pass through the forwarding node 310 and be forwarded by the forwarding node 310. For example, the forwarding node 310 may receive the communication 320 and may re-generate a signal of the communication 320 based at least in part on the communication 320. In some cases, an indirect link 330 may be an access link, a side link, or a fronthaul link. For example, if the first wireless node 305 is a base station 110 and the second wireless node 315 is a UE 120, the indirect link 330 between the first wireless node 305 and the forwarding node 310 may be a fronthaul link. The indirect link 330 between the forwarding node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
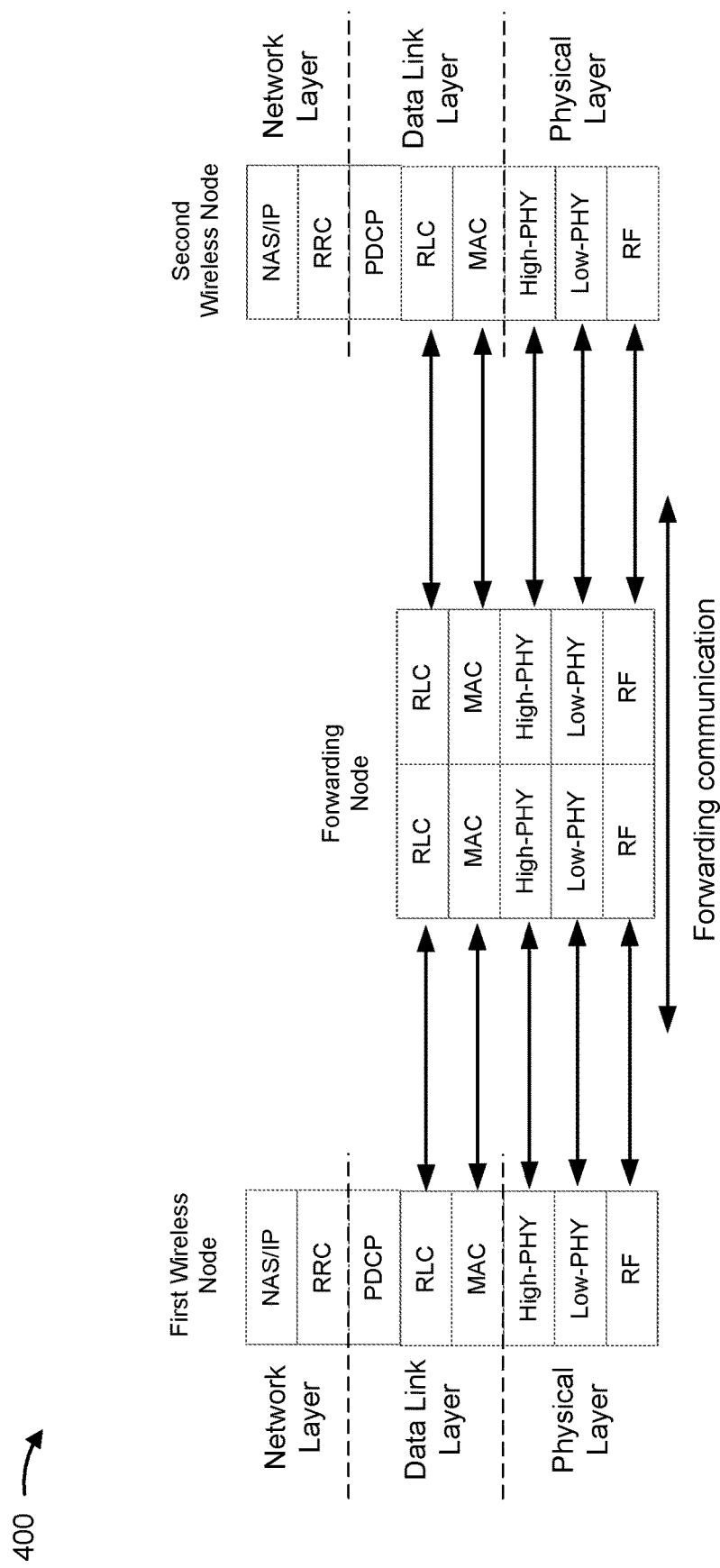
FIG. 4 is a diagram illustrating an example of a protocol stack for repeating communications between a first wireless node and a second wireless node, in accordance with the present disclosure.

FIG. 4 is a diagram illustrating an example 400 of a protocol stack for repeating communications between a first wireless node and second wireless node, in accordance with the present disclosure. In some aspects, the first wireless node may be the first wireless node 305 and the second wireless node may be the second wireless node 315. In some aspects, the first wireless node and the second wireless node may communicate with a forwarding node (e.g., forwarding node 310 and/or the like).

As shown in FIG. 4, an NR protocol stack implemented on a first wireless node and on a second wireless node includes a network layer (e.g., Layer 3), a data link layer (e.g., Layer 2) and a physical layer (e.g., Layer 1). The network layer may include a non-access stratum (NAS) layer, an internet protocol (IP) layer, a radio resource control (RRC) layer, and/or the like. The data link layer may include a packet data convergence protocol (PDCP) layer, a radio link control (RLC), a medium access control (MAC), and/or the like. The physical layer may include a high-physical (PHY) layer, a low-PHY layer, a radio frequency (RF) layer, and/or the like. In some aspects, the PDCP layer on a wireless node may include an adaptation sub-layer (e.g., a service data adaptation protocol (SDAP) sub-layer) and/or the like.

In some aspects, such as in an IAB network, the NAS layer, the IP layer, the RRC layer, the PDCP layer, and/or the like may be included in a central unit (CU) of an IAB donor. The remaining layers (e.g., the RLC layer, the MAC layer, the high-PHY layer, the low-PHY layer, the RF layer, and/or the like) may be included in a distributed unit (DU) of an IAB donor and/or of an IAB node.

When communicating directly with the second wireless node, the first wireless node may communicate at an RLC layer, a MAC layer, a high-PHY layer, a low-PHY layer, an RF layer, and/or the like. As shown in FIG. 4, the layers in the first wireless node may communicate with corresponding layers in the second wireless node. However, in a repeating scenario, the first wireless node may communicate via a link (e.g., an access link, a fronthaul link, and/or the like) with a forwarding node. For example, to enable Layer 2 repeating (e.g., data link layer repeating) between the first wireless node and the second wireless node, the forwarding node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based at least in part on passing information between these layers, the forwarding node enables Layer 2 repeating between the first wireless node and the second wireless node.

In some aspects, the forwarding node may utilize Layer 1 repeating (e.g., physical layer repeating). For example, the forwarding node may not include an RLC layer or a MAC layer. As the forwarding node may not include an RLC or MAC layer, the forwarding node may be configured and/or scheduled by a control node (e.g., a CU, an IAB donor, and IAB node, a base station 110, the first wireless node, the second wireless node, and/or the like). The forwarding node may communicate with the first wireless node and the second wireless node at the physical layer only (e.g., rather than the data link layer and the physical layer). Based at least in part on passing information between these layers, the forwarding node enables Layer 1 repeating between the first wireless node and the second wireless node.

As indicated above, FIG. 4 is provided as an example. Other examples may differ from what is described with respect to FIG. 4.

Figure 5:
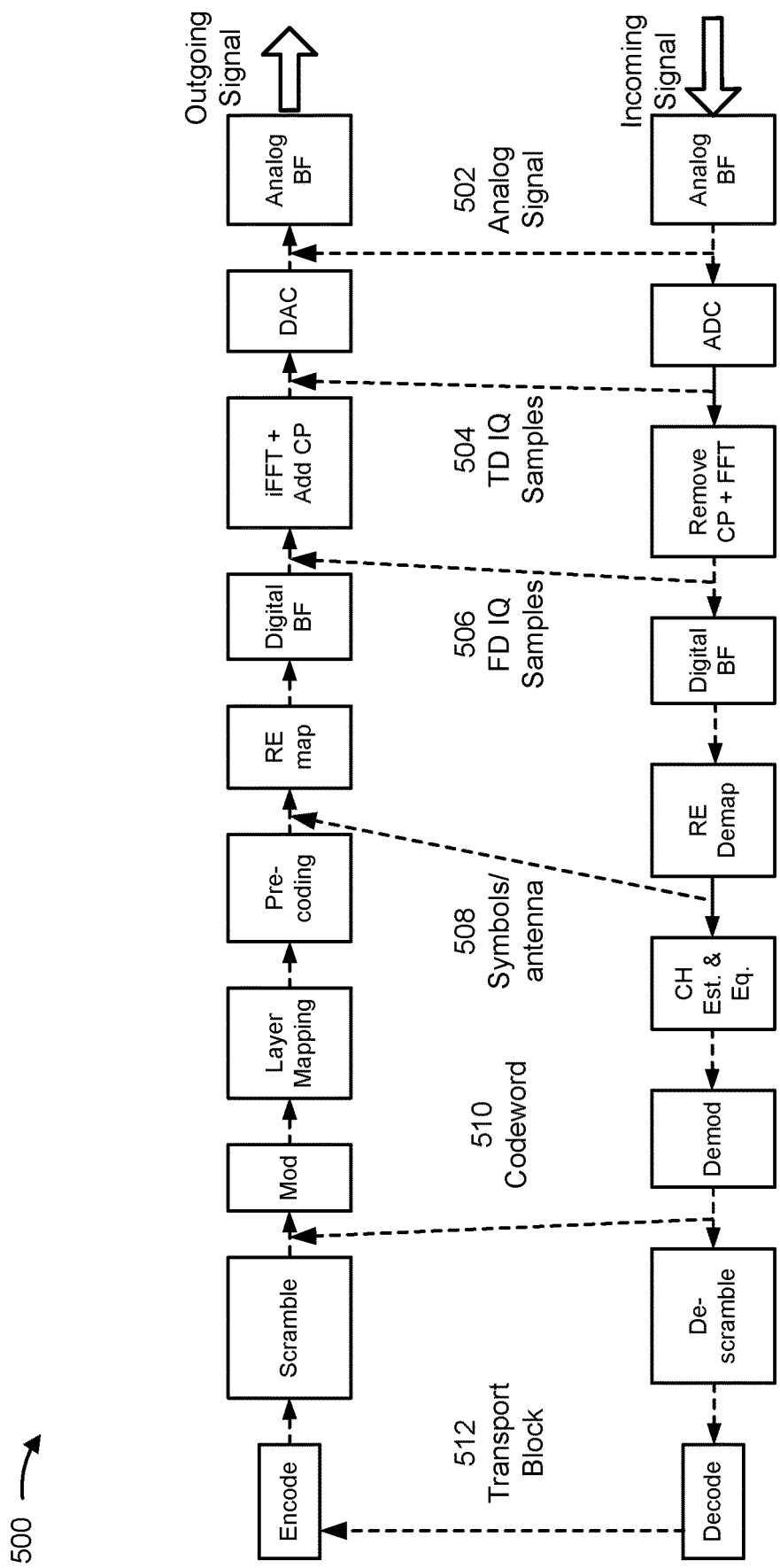
FIG. 5 is a diagram illustrating an example of techniques for processing operations for a repeating operation performed by a repeater node, in accordance with the present disclosure.

FIG. 5 is a diagram illustrating an example 500 of processing operations for a repeating operation performed by a repeater node, in accordance with the present disclosure. A repeating operation may include a repeater node receiving a signal from a first wireless node, processing the signal, re-generating the same signal based at least in part on the processing of the signal, or transmitting the re-generated signal to a second wireless node. In this way, the repeater node may repeat the signal received from the first wireless node to the second wireless node.

As shown by reference number 502, the repeater node may receive an incoming signal from a first wireless node and may perform an analog beamforming procedure to obtain an analog signal associated with the incoming signal. The repeater node may extract the analog signal and may re-generate the analog signal in a transmit (Tx) chain of the repeater node. For example, the repeater node may perform an analog beamforming procedure on the analog signal to form the outgoing signal (e.g., the repeater may boost the analog signal, apply an analog beamforming gain, and/or the like). The repeater node may transmit the outgoing signal to a second wireless node. A repeater node that operates in this manner may be referred to as an analog repeater device (e.g., as the incoming signal is not converted from the analog domain to the digital domain).

As shown by reference number 504, after receiving the incoming signal and performing an analog beamforming procedure associated with the incoming signal, the repeater node may convert the incoming signal from the analog domain to the digital domain using an analog-to-digital converter (ADC). After converting the incoming signal from the analog domain to the digital domain, the repeater node may determine one or more time domain in-phase/quadrature (IQ) samples associated with the incoming signal. The repeater node may extract the time domain IQ samples and may store the time domain IQ samples in a buffer of the repeater node. The repeater node may use the time domain IQ samples to regenerate the incoming signal in the Tx chain of the repeater node (e.g., immediately after extracting the time domain IQ samples or at a later time). For example, the repeater node may convert the time domain IQ samples from the digital domain to the analog domain using a digital-to-analog converter (DAC). The repeater node may perform an analog beamforming procedure on the analog signal to form the outgoing signal. The repeater node may transmit the outgoing signal to a second wireless node.

As shown by reference number 506, after converting the incoming signal from the analog domain to the digital domain, the repeater node may remove a cyclic prefix (CP) associated with the incoming signal and perform a fast-Fourier transform (FFT) on the incoming signal. After removing the CP and performing the FFT associated with the incoming signal, the repeater node may determine one or more frequency domain IQ samples associated with the incoming signal. The repeater node may extract the frequency domain IQ samples and may store the frequency domain IQ samples in a buffer of the repeater node. The repeater node may use the frequency domain IQ samples to regenerate the incoming signal in the Tx chain of the repeater node (e.g., immediately after extracting the frequency domain IQ samples or at a later time). For example, the repeater node may perform an inverse FFT (iFFT) operation on the frequency domain IQ samples, in order to generate time domain IQ samples. The repeater node may add a CP to the time domain IQ samples. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 508, after removing the CP and performing FFT associated with the incoming signal, the repeater node may perform a digital beamforming procedure associated with the incoming signal. The repeater node may perform a resource element (RE) de-mapping operation associated with the incoming signal. After performing the digital beamforming procedure and the RE de-mapping procedure, the repeater node may determine one or more IQ samples of occupied tones (e.g., a quantity of symbols per antenna element) associated with the incoming signal. The repeater node may extract the IQ samples of occupied tones and may store the IQ samples of occupied tones in a buffer of the repeater node. The repeater node may use the IQ samples of occupied tones to regenerate the incoming signal in the Tx chain of the repeater node (e.g., immediately after extracting the IQ samples of occupied tones or at a later time). For example, the repeater node may perform an RE mapping procedure (e.g., the inverse of the RE de-mapping procedure) associated with the IQ samples of occupied tones. The repeater node may perform a digital beamforming procedure associated with the IQ samples of occupied tones. After performing the digital beamforming procedure, the repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 510, after performing the digital beamforming procedure and the RE de-mapping operation, the repeater node may perform channel estimation and equalization associated with the incoming signal (e.g., to determine and/or remove noise and wireless channel variations associated with the incoming signal). The repeater node may perform a demodulation operation associated with the incoming signal. After performing channel estimation and equalization and the demodulation operation, the repeater node may determine a codeword associated with the incoming signal. The repeater node may extract the codeword and may store the codeword in a buffer of the repeater node. The repeater node may use the codeword to regenerate the incoming signal in the Tx chain of the repeater node (e.g., immediately after extracting the codeword or at a later time). For example, the repeater node may perform a modulation operation, a layer mapping operation, a pre-coding operation, an RE-mapping operation, and/or a digital beamforming procedure associated with the codeword. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 512, after performing the channel estimation and equalization and demodulation operation associated with the incoming signal, the repeater node may perform a de-scrambling operation (e.g., using scrambling identifiers associated with the incoming signal). The repeater node may decode the incoming signal in accordance with a network coding scheme associated with the incoming signal. After decoding the incoming signal, the repeater node may determine a transport block associated with the incoming signal. The repeater node may extract the transport block and may store the transport block in a buffer of the repeater node. The repeater node may use the transport block to regenerate the incoming signal in the Tx chain of the repeater node (e.g., immediately after extracting the transport block or at a later time). For example, the repeater node may encode the transport block (e.g., in accordance with the network coding scheme) and scramble the encoded transport block. The repeater node may perform a modulation operation, a layer mapping operation, a pre-coding operation, an RE-mapping operation, and/or a digital beamforming procedure associated with the scrambled transport block. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

The different operations described above may be configured by a control node associated with the repeater node. For example, a level of processing (e.g., as shown by reference numbers 502, 504, 506, 508, 510, and 512) may be indicated to the repeater node by the control node. A repeater node that performs processing of an incoming signal after converting the signal to the digital domain may be referred to as a digital repeater device. For example, a repeater node that performs the operations described above with respect to reference numbers 504, 506, 508, 510, or 512 may be referred to as a digital repeater device.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of components (e.g., one or more components) shown in FIG. 5 may perform one or more functions described as being performed by another set of components shown in FIG. 5.

Figure 6A:
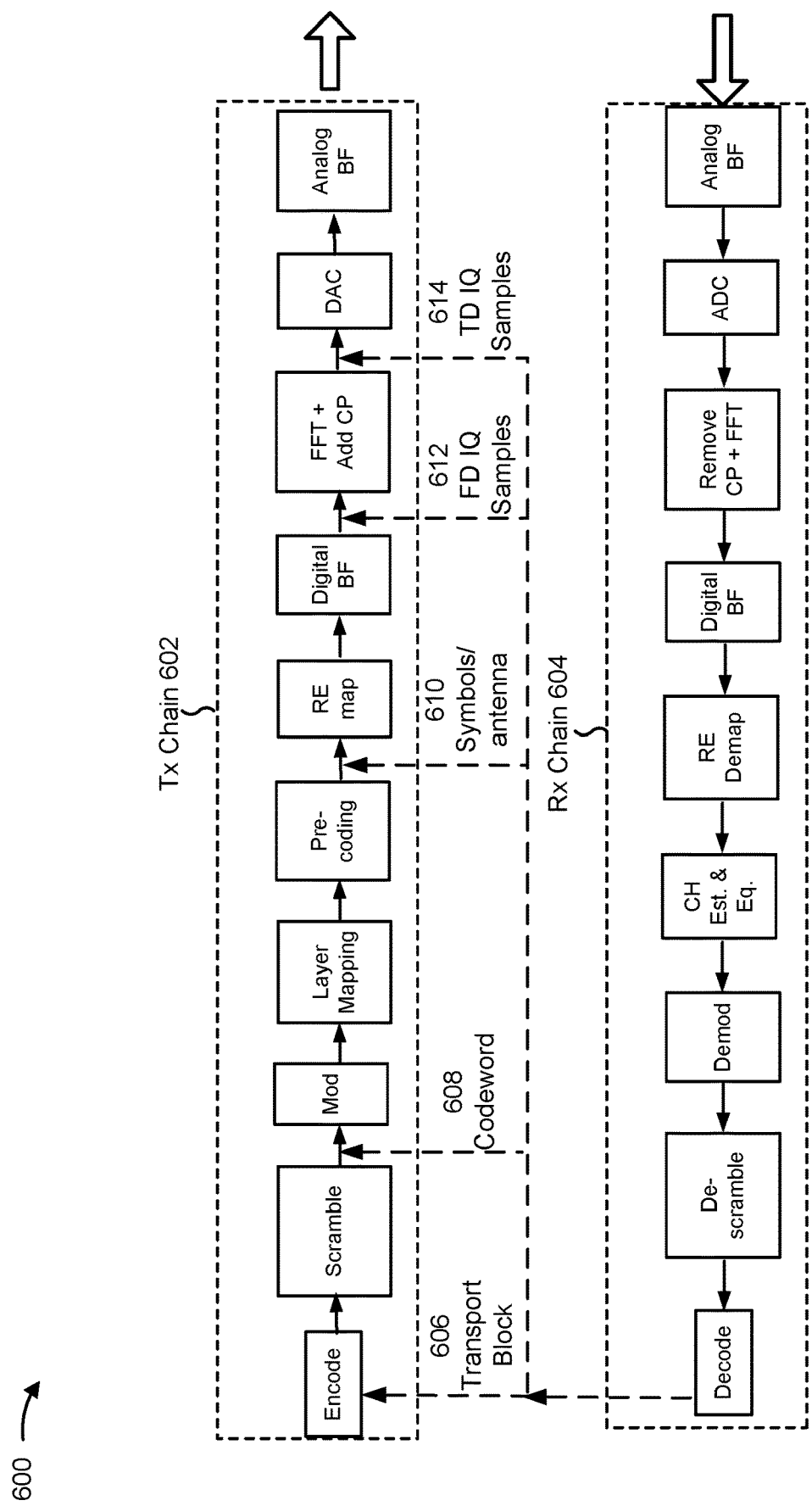
FIGS. 6A and 6B are diagrams illustrating examples of transmit and receive chains of a Layer 1 relay node, in accordance with the present disclosure.
Figure 6B:
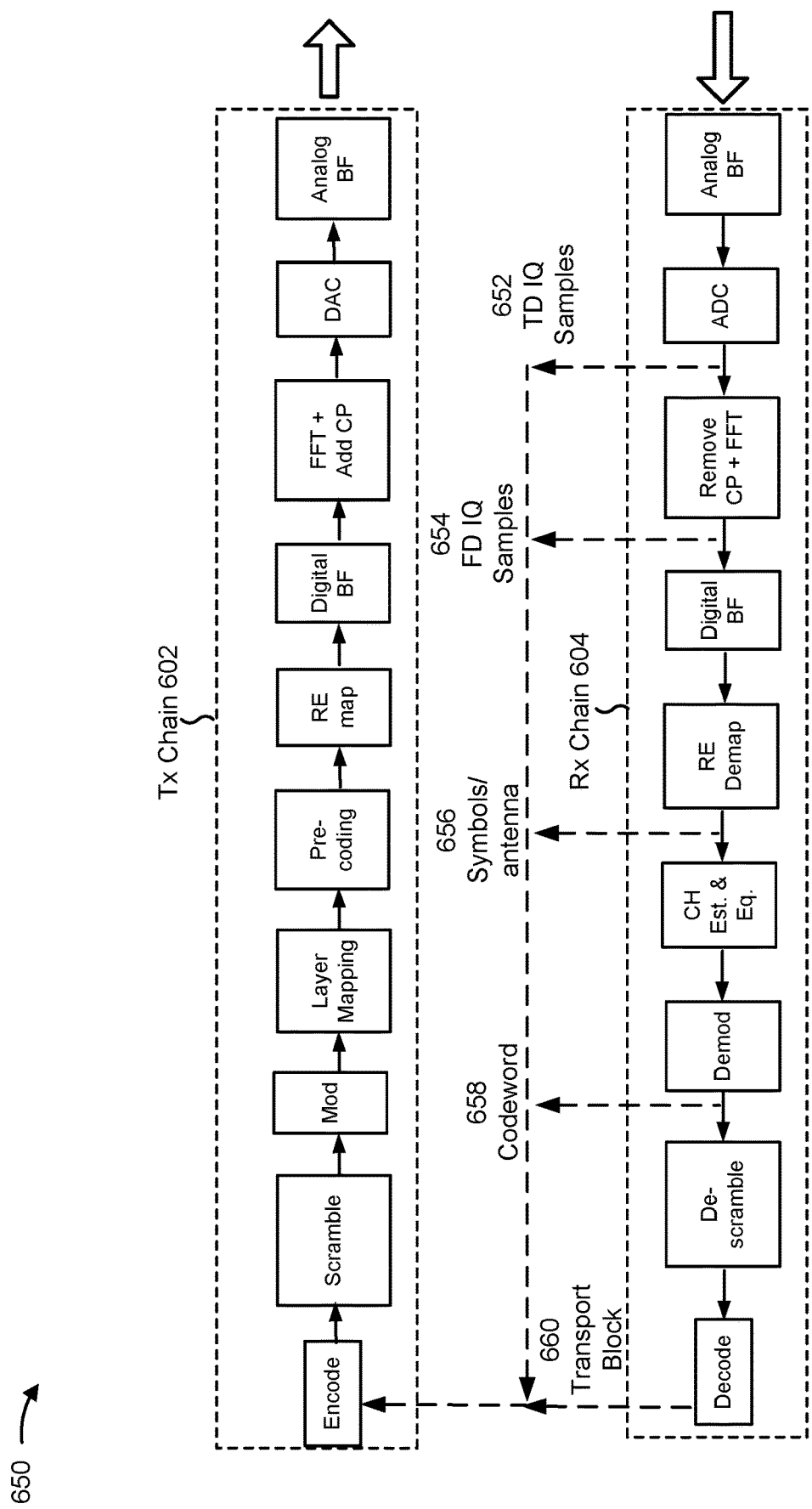

FIGS. 6A and 6B are diagrams illustrating examples 600 and 650 of transmit (Tx) and receive (Rx) chains of a Layer 1 relay node, in accordance with the present disclosure.

In some aspects, one or more components of Tx chain 602 may be implemented in transmit processor 264, TX MIMO processor 266, MOD/DEMOD 254, controller/processor 280, and/or the like, as described above in connection with FIG. 2. In some aspects, Tx chain 602 may be implemented in a relay node (e.g., relay node 715 and/or the like) for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 604 may be implemented in receive processor 258, MIMO detector 256, MOD/DEMOD 254, controller/processor 280, and/or the like, as described above in connection with FIG. 2. In some aspects, Rx chain 604 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 6A and example 600, the incoming signal may be received by the relay node over a fronthaul link. For example, the incoming signal may be downlink information received from a DU of an IAB node, a base station 110, and/or the like. As shown in FIG. 6A, the incoming signal may be processed by the Rx chain 604. For example, the relay node may fully decode the incoming signal to determine an information (e.g., a payload) carried by the incoming signal. The relay node may perform analog beamforming on the incoming signal. The relay node may convert the incoming signal from the analog domain to the digital domain using an analog-to-digital converter (ADC). The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 602. An amount or level of processing performed by the relay node associated with the Tx chain 602 may be based at least in part on the information carried by the incoming signal, a configuration received by the relay node (e.g., from a control node and/or the like), and/or the like.

As shown by reference number 606, if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying a FFT and/or adding a CP, converting the signal from the digital domain to the analog domain with a digital-to-analog converter (DAC), performing analog beamforming, and transmitting the outgoing signal).

As shown by reference number 608, if the incoming signal is carrying a codeword, the relay node may not perform encoding or scrambling to generate the outgoing signal. That is, the relay node may modulate the codeword, perform layer mapping, perform pre-coding, perform digital Rx beamforming, apply a FFT and/or add a CP, convert the signal from the digital domain to the analog domain with a DAC, perform analog beamforming, and transmit the outgoing signal.

As shown by reference number 610, if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 612, if the incoming signal is carrying frequency domain IQ samples, the relay node may not be encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 614, if the incoming signal is carrying time domain IQ samples, the relay node may not be encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal based at least in part on the information carried by the incoming signal.

As shown in FIG. 6B and example 650, the incoming signal may be received by the relay node over an access link. For example, the incoming signal may be uplink information received from a mobile termination (MT) unit of an IAB node, a UE 120, and/or the like. In some aspects, the device transmitting the incoming signal may be unaware of the relay node.

The relay node may perform different levels of digital processing to determine information associated with the incoming signal. The level of processing may be based at least in part on a configuration received by the relay node (e.g., from a control node and/or the like). For example, as shown by reference number 652, the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 654, the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 656, the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 658, the relay node may process the incoming signal to determine a received codeword (e.g., log-likelihood (LLR) values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 660, the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about the incoming signal based at least in part on the level of processing performed by the relay node.

The number and arrangement of components shown in FIGS. 6A and 6B are provided as an example. In practice, there may be additional components, fewer components, different components, or differently arranged components than those shown in FIGS. 6A and 6B. Furthermore, two or more components shown in FIGS. 6A and/or 6B may be implemented within a single component, or a single component shown in FIGS. 6A and/or 6B may be implemented as multiple, distributed components. Additionally, or alternatively, a set of components (e.g., one or more components) shown in FIGS. 6A and/or 6B may perform one or more functions described as being performed by another set of components shown in FIGS. 6A and/or 6B.

In some wireless networks, a forwarding node (e.g., a repeater node or a relay node) may forward every received message to a receiver node. However, when a receipt occasion is scheduled for the forwarding node to receive unscheduled communications from one or more transmitting nodes (e.g., UEs), the forwarding node may forward any signals received during the receipt occasion. In other words, if the forwarding node monitors a receipt occasion, the forwarding node forwards any signals and/or noise detected during the receipt occasion, even if the signals do not include an unscheduled communication intended for the receiver node. Based at least in part on forwarding any signals and/or noise detected during the receipt occasion, the forwarding node and/or a receiver node may consume processing, power, communication, and/or network resources to transmit the signals and/or noise and attempt to receive an unscheduled communication within the signals and/or the noise.

In some aspects described herein, a forwarding node may receive an unscheduled communication from a first wireless communication device (e.g., a UE). The unscheduled communication may be a communication about which a receiver node is not aware of whether a transmitter node will transmit the communication during a receipt occasion. In some aspects, the unscheduled communication may be a scheduling request, a random access channel (RACH) communication, a configured grant communication (e.g., an uplink or sidelink communication), a control channel communication (e.g. a downlink communication), a paging communication, and/or the like. In some aspects, the forwarding node may be configured (e.g., by a control node) to determine whether the forwarding node receives an unscheduled communication within a received signal (e.g., based at least in part on a signal-to-interference-plus-noise ratio (SINR) of the received signal, a coding of the received signal, and/or the like).

The forwarding node may transmit, to a control node and/or a second wireless communication device, an indication of receipt of the communication. In some aspects, the indication may include a scheduling request for a resource to forward the unscheduled communication (e.g., via a regeneration of the unscheduled communication, a communication that is based at least in part on the unscheduled communication, and/or the like), an indication that the forwarding node will use an available resource to forward the unscheduled communication, a number of unscheduled communications received by the forwarding node, an indication of one or more parameters associated with monitoring the receipt occasion, a measurement report (e.g., a report of samples taken during the receipt occasion), a detection report (a report indicating detection of an unscheduled communication), and/or the like. In some aspects, the forwarding node may use a configured (e.g., a semi-statically configured) resource to transmit the indication to the control node.

In some aspects, the forwarding node may only transmit the indication based at least in part on determining that the forwarding node received an unscheduled communication. In some aspects (e.g., when receiving an unscheduled communication is more common than not receiving an unscheduled communication during receipt occasions), the forwarding node may send a negative indication that indicates that a receipt occasion (e.g., or a set of receipt occasions) did not include an unscheduled communication, and/or that the forwarding node will not forward any unscheduled communications during a subsequent forwarding resource (e.g., a configured resource). In some aspects, the control node may configure the forwarding node to transmit an indication based at least in part on determining that the forwarding node received an unscheduled communication, based at least in part on determining that the forwarding node did not receive an unscheduled communication, or independently from determining whether the forwarding node received an unscheduled communication.

The control node may transmit a configuration for forwarding the unscheduled communication to the control node or the second wireless communication device. The forwarding node may forward the unscheduled communication (e.g., along with any other received unscheduled communications) to the control node or the second wireless communication device.

Based at least in part on the forwarding node transmitting an indication of whether the forwarding node received an unscheduled communication, the forwarding node and/or a receiver node may conserve processing, power, communication, and/or network resources that may otherwise have been used to transmit signals and/or noise received during a receipt occasion and to attempt to receive an unscheduled communication within the signals and/or the noise.

Figure 7:
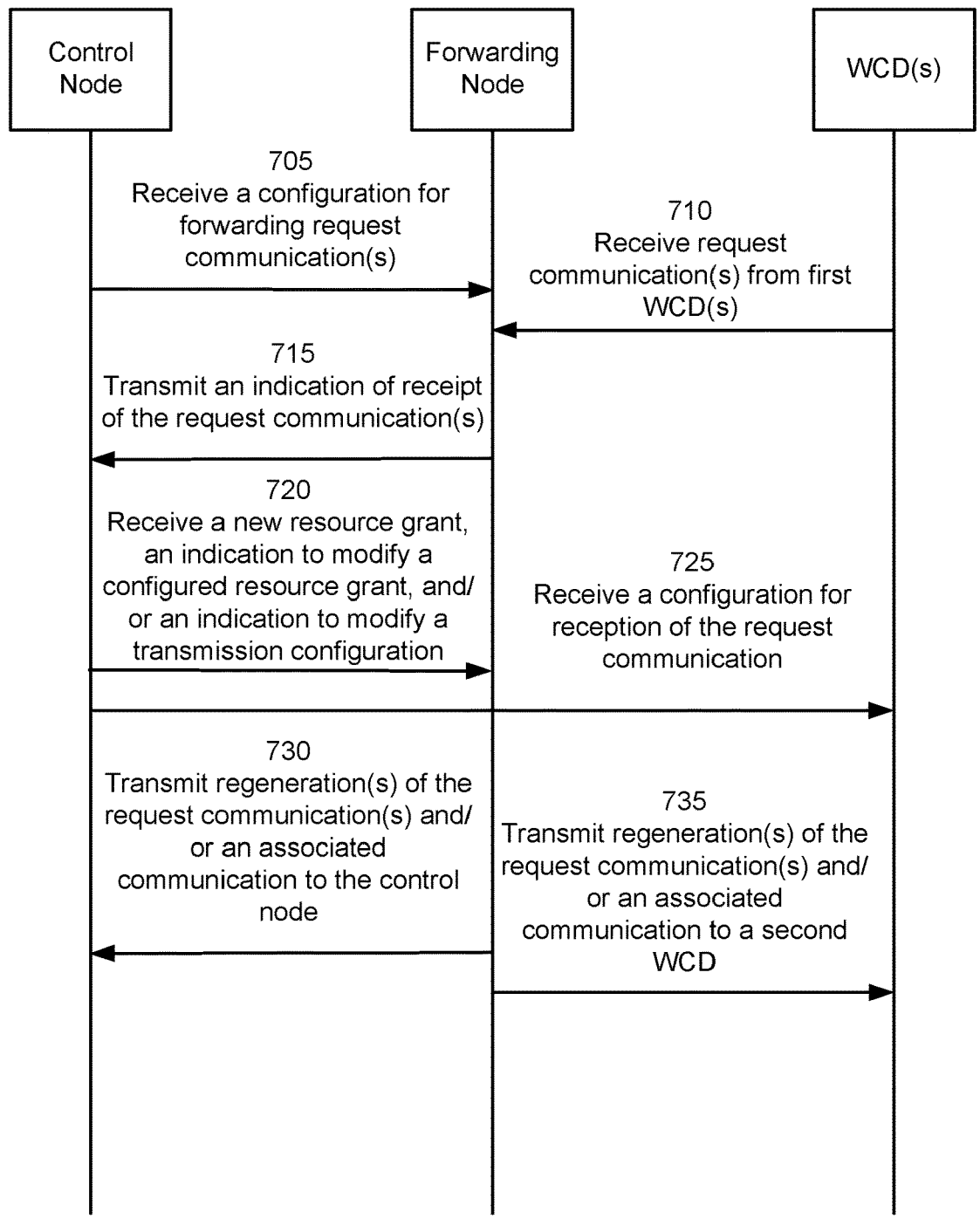
FIG. 7 is a diagram illustrating an example associated with techniques for forwarding an unscheduled communication, in accordance with the present disclosure.

FIG. 7 is a diagram illustrating an example 700 associated with techniques for forwarding an unscheduled communication, in accordance with the present disclosure. As shown in FIG. 7, a control node (e.g., a base station 110) may communicate with a forwarding node (e.g., a base station 110) and/or one or more wireless communication devices. The one or more wireless communication devices may include one or more transmitter nodes, receiver nodes, and/or the like. The control node, the forwarding node, and the one or more wireless communication devices may be part of a wireless network (e.g., wireless network 100). In some aspects, the forwarding node may be a repeater node, a relay node, and/or the like. In some aspects, a wireless communication device that is a receiver node may include a base station, an integrated access backhaul node, and/or the like. In some aspects, a wireless communication device that is a transmitter node may include a UE, an integrated access backhaul node, and/or the like. In some aspects, the control node may include the receiver node.

As shown by reference number 705, the forwarding node may receive a configuration for forwarding one or more unscheduled communications. In some aspects, the configuration for forwarding one or more unscheduled communications may identify one or more resources (e.g., configured resources, semi-statically configured resources, and/or the like) to use for forwarding the one or more unscheduled communications. In some aspects, the configuration for forwarding one or more unscheduled communications may indicate that the forwarding node is to associate one or more receipt occasions for receiving unscheduled communications (e.g., unscheduled communications, scheduling requests, RACH communications, and/or the like) with one or more resources for forwarding the unscheduled communications (e.g., via a regeneration of the unscheduled communication, a communication that is based at least in part on the unscheduled communication, and/or the like).

In some aspects, the configuration for forwarding one or more unscheduled communications may indicate that the forwarding node is to compile unscheduled communications from multiple wireless communication devices (e.g., transmitter devices) for transmitting as a single communication to the receiver node.

As shown by reference number 710, the forwarding node may receive one or more unscheduled communications from one or more wireless communication devices. For example, the forwarding node may receive, from a first wireless communication device and during a receipt occasion, an unscheduled communication for forwarding to a second wireless communication device and/or the control node. In some aspects, the forwarding node may receive the unscheduled communication based at least in part on monitoring the receipt occasion to determine whether the first wireless communication device and/or any additional wireless communication devices transmitted the unscheduled communication. For example, the forwarding node may determine whether the forwarding node receives an unscheduled communication within a received signal based at least in part on an SINR of the received signal, a coding of the received signal, and/or the like.

In some aspects, the forwarding node may receive one or more additional unscheduled communications for forwarding to the second wireless communication device during one or more additional receipt occasions. The one or more additional receipt occasions may be received via time division multiplexing, frequency division multiplexing, code division multiplexing, and/or the like. In other words, the forwarding node may receive the unscheduled communication and the one or more additional receipt occasions using resources at different frequencies, at different times, and/or with different coding.

As shown by reference number 715, the forwarding node may transmit an indication of receipt of the one or more unscheduled communications. For example, the forwarding node may transmit an indication of receipt of the unscheduled communication to the second wireless communication device or the control node. In some aspects, the forwarding node may transmit the indication of receipt of the unscheduled communication via one or more resources associated with multiple receipt occasions. In some aspects, the forwarding node may transmit the indication of receipt of the unscheduled communication via one or more resources of a configured grant, a dynamic grant, and/or the like.

In some aspects, the indication of receipt of the unscheduled communication may include a scheduling request (e.g., for resources to use for forwarding the one or more unscheduled communications), an indication of a number of receipt occasions on which the forwarding node received unscheduled communications including the unscheduled communication (e.g., to indicate a number of scheduling requests to be forwarded), an indication of one or more parameters associated with monitoring the receipt occasion (e.g., SINR, received power, and/or the like), a measurement report, a detection report, and/or the like.

As shown by reference number 720, the forwarding node may receive a new resource grant, an indication to modify a configured resource grant, and/or an indication to modify a transmission configuration (e.g., for forwarding the one or more unscheduled communications). In some aspects, the indication to modify a configured resource grant and/or to modify the transmission configuration may indicate to modify a number of resources allocated in the configured grant (e.g., based at least in part on an indication of a number of unscheduled communications to be forwarded), to modify a transmission power, to modify an MCS, to modify a coding rate, to modify a transmission beam configuration, and/or the like.

As shown by reference number 725, a second wireless communication device may receive a configuration for reception of the unscheduled communication. In some aspects (e.g., in which the unscheduled communication is intended for the second wireless communication device and not the control node), the control node may indicate the configuration for reception of the one or more unscheduled communications by the second communication device that is based at least in part on a configuration for forwarding the one or more unscheduled communications by the forwarding node. For example, the control node may indicate resources (e.g., a configured resource, a dynamically indicated resource, and/or the like), an MCS, a coding rate, a transmission beam configuration of the forwarding node, and/or the like that the forwarding node is configured to use for forwarding the one or more unscheduled communications.

As shown by reference number 730, the forwarding node may transmit one or more regenerations of the one or more unscheduled communications and/or an associated communication to the control node. In some aspects, the forwarding node may include a repeater node and may transmit one or more regenerations of the one or more unscheduled communications. In some aspects, the forwarding node may include a relay node and may transmit one or more communications that are based at least in part on the one or more unscheduled communications.

As shown by reference number 735, the forwarding node may transmit one or more regenerations of the one or more unscheduled communications and/or an associated communication to a second wireless communication device (e.g., a receiver node). In some aspects (e.g., in which the unscheduled communication is intended for the second wireless communication device and not the control node), the forwarding node may transmit the one or more regenerations of the one or more unscheduled communications and/or one or more communications that are based at least in part on the one or more unscheduled communications to the second wireless communication device.

Based at least in part on the forwarding node transmitting an indication of whether the forwarding node received an unscheduled communication, the forwarding node, the second wireless communication device, the control node, and/or the like may conserve processing, power, communication, and/or network resources that may otherwise have been used to transmit signals and/or noise received during the receipt occasion and to attempt to receive an unscheduled communication within the signals and/or the noise.

Figure 8:
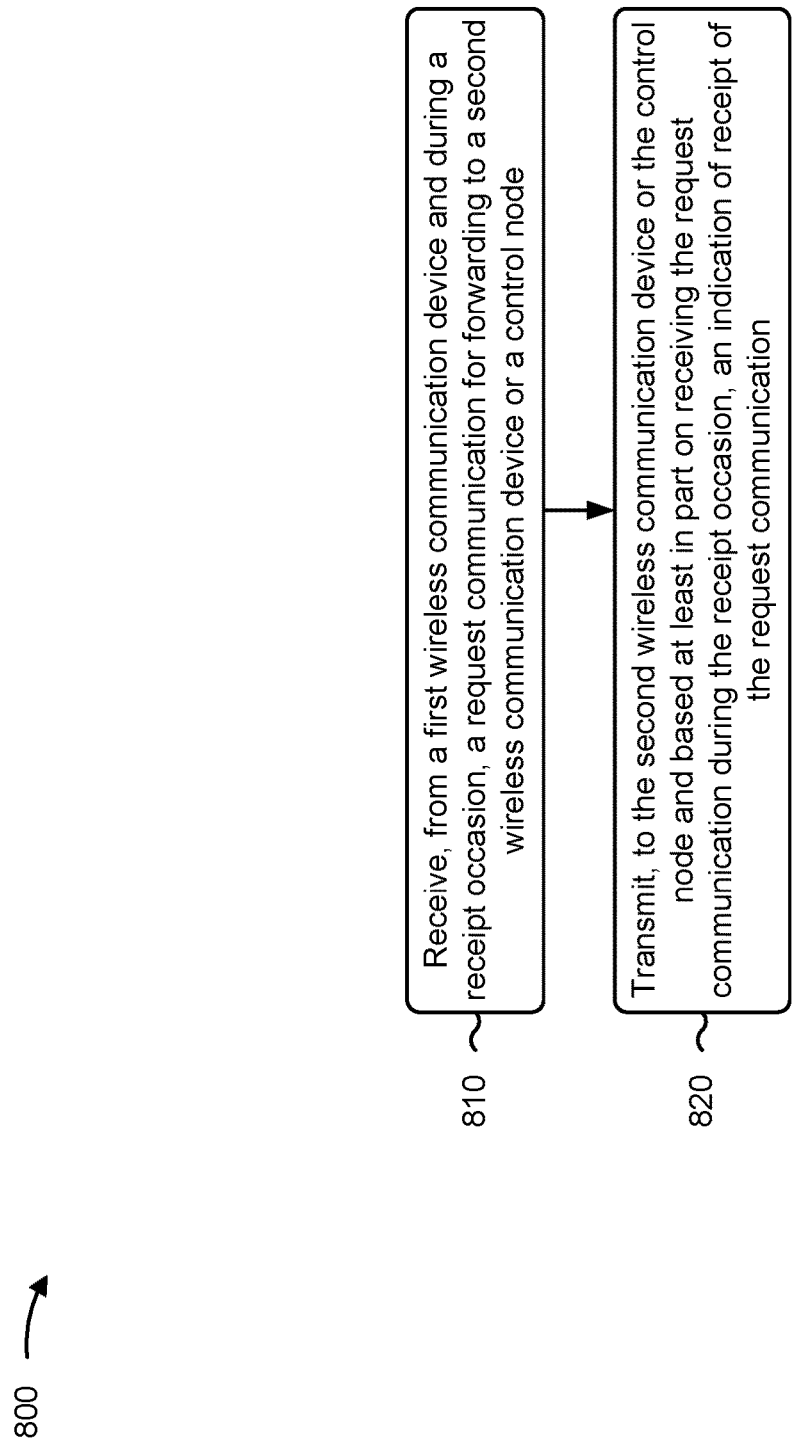
FIGS. 8-10 are diagrams illustrating example processes associated with techniques for self-interference measurement for a repeater, in accordance with the present disclosure.

FIG. 8 is a diagram illustrating an example process 800 performed, for example, by a forwarding node, in accordance with the present disclosure. Example process 800 is an example where the forwarding node (e.g., base station 110, apparatus 1100 (described below), and/or the like) performs operations associated with techniques for forwarding an unscheduled communication.

As shown in FIG. 8, in some aspects, process 800 may include receiving, from a first wireless communication device and during a receipt occasion, an unscheduled communication for forwarding to a second wireless communication device or a control node (block 810). For example, the forwarding node (e.g., using reception component 1102) may receive, from a first wireless communication device and during a receipt occasion, an unscheduled communication for forwarding to a second wireless communication device or a control node, as described above.

As further shown in FIG. 8, in some aspects, process 800 may include transmitting, to the second wireless communication device or the control node, and based at least in part on receiving the unscheduled communication during the receipt occasion, an indication of receipt of the unscheduled communication (block 820). For example, the forwarding node (e.g., using transmission component 1104 in FIG. 11) may transmit, to the second wireless communication device or the control node, and based at least in part on receiving the unscheduled communication during the receipt occasion, an indication of receipt of the unscheduled communication, as described above.

Process 800 may include additional aspects, such as any single aspect or any combination of aspects described below and/or in connection with one or more other processes described elsewhere herein.

In a first aspect, process 800 includes transmitting, to the second wireless communication device or the control node, a regeneration of the unscheduled communication, or transmitting, to the second wireless communication device or the control node, a communication that is based at least in part on the unscheduled communication.

In a second aspect, alone or in combination with the first aspect, process 800 includes receiving, from one or more additional wireless communication devices and during one or more additional receipt occasions, one or more additional unscheduled communications for forwarding to the second wireless communication device, and transmitting, to the second wireless communication device or the control node, regenerations of the unscheduled communication and the one or more additional unscheduled communications, or one or more communications that are based at least in part on the unscheduled communication and the one or more additional unscheduled communications.

In a third aspect, alone or in combination with one or more of the first and second aspects, process 800 includes receiving a new resource grant, an indication to modify a configuration of a configured resource grant, or an indication to modify a transmission configuration based at least in part on transmission of the indication of receipt of the unscheduled communication.

In a fourth aspect, alone or in combination with one or more of the first through third aspects, transmission of the indication of receipt of the unscheduled communication includes one or more of transmission of the indication of receipt of the unscheduled communication via one or more resources associated with multiple receipt occasions, or transmission of the indication of receipt of the unscheduled communication via one or more resources of a configured grant.

In a fifth aspect, alone or in combination with one or more of the first through fourth aspects, the indication of receipt of the unscheduled communication includes one or more of a scheduling request, an indication of a number of receipt occasions on which the forwarding node received unscheduled communications including the unscheduled communication, an indication of one or more parameters associated with monitoring the receipt occasion, a measurement report, or a detection report.

In a sixth aspect, alone or in combination with one or more of the first through fifth aspects, the unscheduled communication includes a scheduling request, a configured grant communication, a control channel communication, a paging communication, or a RACH communication.

In a seventh aspect, alone or in combination with one or more of the first through sixth aspects, reception of the unscheduled communication includes monitoring the receipt occasion to determine whether the first wireless communication device transmitted the unscheduled communication.

In an eighth aspect, alone or in combination with one or more of the first through seventh aspects, one or more of: the forwarding node includes a repeater node or a relay node, the second wireless communication device includes a base station or an integrated access backhaul node, or the control node includes the second wireless communication device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
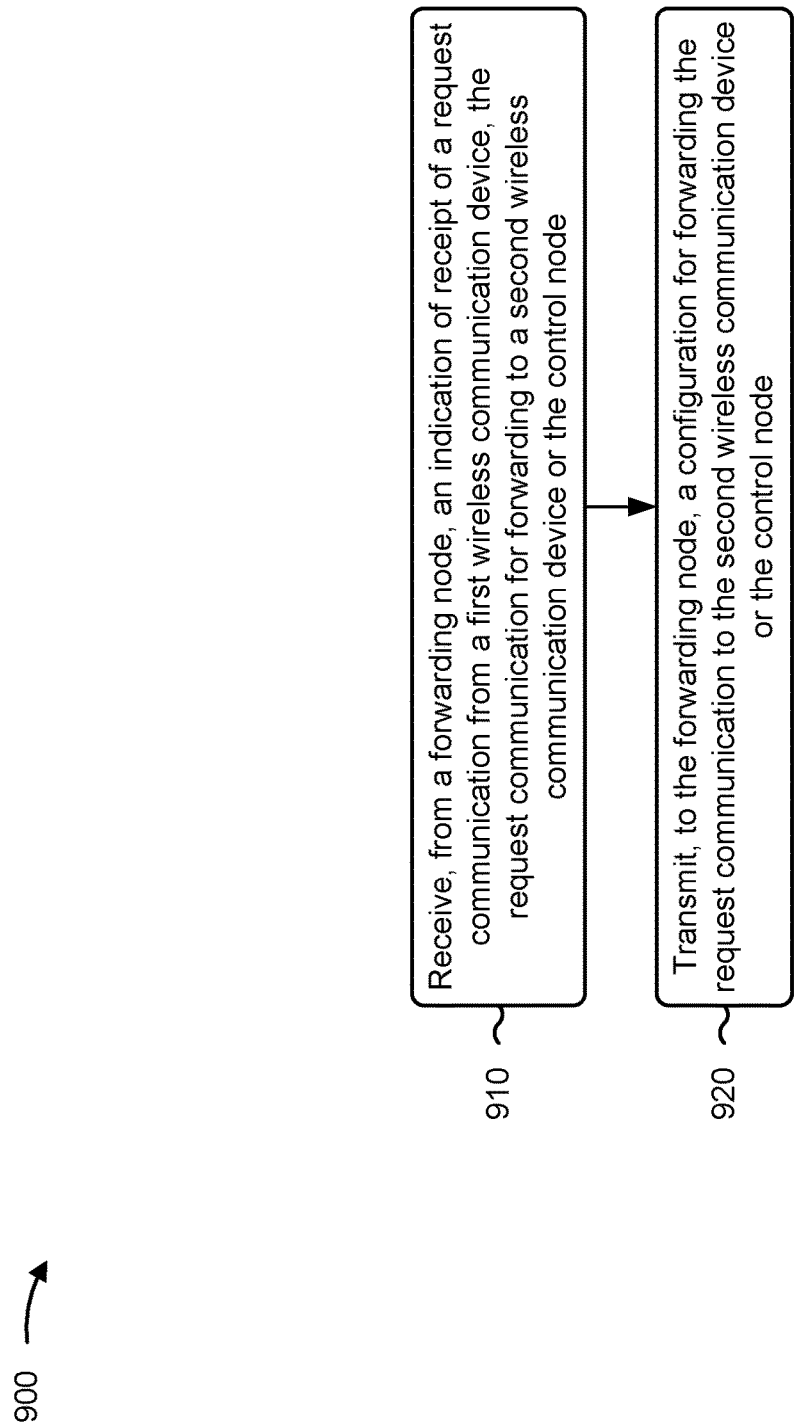

FIG. 9 is a diagram illustrating an example process 900 performed, for example, by a control node, in accordance with the present disclosure. Example process 900 is an example where the control node (e.g., base station 110, apparatus 1200 (described below), and/or the like) performs operations associated with techniques for forwarding an unscheduled communication.

As shown in FIG. 9, in some aspects, process 900 may include receiving, from a forwarding node, an indication of receipt of an unscheduled communication from a first wireless communication device, the unscheduled communication for forwarding to a second wireless communication device or the control node (block 910). For example, the control node (e.g., using reception component 1202) may receive, from a forwarding node, an indication of receipt of an unscheduled communication from a first wireless communication device, the unscheduled communication for forwarding to a second wireless communication device or the control node, as described above.

As further shown in FIG. 9, in some aspects, process 900 may include transmitting, to the forwarding node, a configuration for forwarding the unscheduled communication to the second wireless communication device or the control node (block 920). For example, the control node (e.g., using transmission component 1204) may transmit, to the forwarding node, a configuration for forwarding the unscheduled communication to the second wireless communication device or the control node, as described above.

Process 900 may include additional aspects, such as any single aspect or any combination of aspects described below and/or in connection with one or more other processes described elsewhere herein.

In a first aspect, process 900 includes transmitting, to the second wireless communication device, a configuration for reception of the unscheduled communication from the forwarding node.

In a second aspect, alone or in combination with the first aspect, the configuration for reception of the unscheduled communication from the forwarding node includes one or more of: an indication to receive the unscheduled communication via an indicated resource, or an indication to receive the unscheduled communication via a configured resource.

In a third aspect, alone or in combination with one or more of the first and second aspects, process 900 includes receiving, from the forwarding node, a regeneration of the unscheduled communication, or receiving, from the forwarding node, a communication that is based at least in part on the unscheduled communication.

In a fourth aspect, alone or in combination with one or more of the first through third aspects, process 900 includes one or more of receiving, from the forwarding node, regenerations of the unscheduled communication and one or more additional unscheduled communications, or receiving one or more communications that are based at least in part on the unscheduled communication and the one or more additional unscheduled communications.

In a fifth aspect, alone or in combination with one or more of the first through fourth aspects, process 900 includes transmitting, to the forwarding node and based at least in part on reception of the indication of receipt of the unscheduled communication, one or more of a new resource grant, an indication to modify a configuration of a configured resource grant, or an indication to modify a transmission configuration.

In a sixth aspect, alone or in combination with one or more of the first through fifth aspects, reception of the indication of receipt of the unscheduled communication includes one or more of reception of the indication of receipt of the unscheduled communication via one or more resources associated with multiple receipt occasions, or reception of the indication of receipt of the unscheduled communication via one or more resources of a configured grant.

In a seventh aspect, alone or in combination with one or more of the first through sixth aspects, the indication of receipt of the unscheduled communication includes one or more of a scheduling request, an indication of a number of receipt occasions on which the forwarding node received unscheduled communications including the unscheduled communication, an indication of one or more parameters associated with the forwarding node monitoring a receipt occasion associated with the unscheduled communication, a measurement report, or a detection report.

In an eighth aspect, alone or in combination with one or more of the first through seventh aspects, the unscheduled communication includes a scheduling request, a configured grant communication, a control channel communication, a paging communication, or a RACH communication.

In a ninth aspect, alone or in combination with one or more of the first through eighth aspects, one or more of: the forwarding node includes a repeater node or a relay node, the second wireless communication device includes a base station or an integrated access backhaul node, or the control node includes the second wireless communication device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:

FIG. 10 is a diagram illustrating an example process 1000 performed, for example, by a wireless communication device, in accordance with the present disclosure. Example process 1000 is an example where the wireless communication device ((e.g., base station 110, apparatus 1300 (described below), and/or the like) performs operations associated with techniques for forwarding an unscheduled communication.

As shown in FIG. 10, in some aspects, process 1000 may include receiving, from a control node, a configuration for reception of an unscheduled communication from a forwarding node (block 1010). For example, the wireless communication device (e.g., using reception component 1302) may receive, from a control node, a configuration for reception of an unscheduled communication from a forwarding node, as described above.

As further shown in FIG. 10, in some aspects, process 1000 may include receiving, from the forwarding node, the unscheduled communication (block 1020). For example, the wireless communication device (e.g., using reception component 1302) may receive, from the forwarding node, the unscheduled communication, as described above.

Process 1000 may include additional aspects, such as any single aspect or any combination of aspects described below and/or in connection with one or more other processes described elsewhere herein.

In a first aspect, the configuration for reception of the unscheduled communication from the forwarding node includes one or more of an indication to receive the unscheduled communication via an indicated resource, or an indication to receive the unscheduled communication via a configured resource.

In a second aspect, alone or in combination with the first aspect, process 1000 includes receiving, from the forwarding node, a regeneration of the unscheduled communication, or receiving, from the forwarding node, a communication that is based at least in part on the unscheduled communication.

In a third aspect, alone or in combination with one or more of the first and second aspects, process 1000 includes one or more of: receiving, from the forwarding node, regenerations of the unscheduled communication and one or more additional unscheduled communications, or receiving one or more communications that are based at least in part on the unscheduled communication and the one or more additional unscheduled communications.

In a fourth aspect, alone or in combination with one or more of the first through third aspects, the unscheduled communication includes a scheduling request, a configured grant communication, a control channel communication, a paging communication, or a RACH communication.

In a fifth aspect, alone or in combination with one or more of the first through fourth aspects, one or more of: the forwarding node includes a repeater node or a relay node, the wireless communication device includes a base station or an integrated access backhaul node, or the control node includes a base station or an integrated access backhaul node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
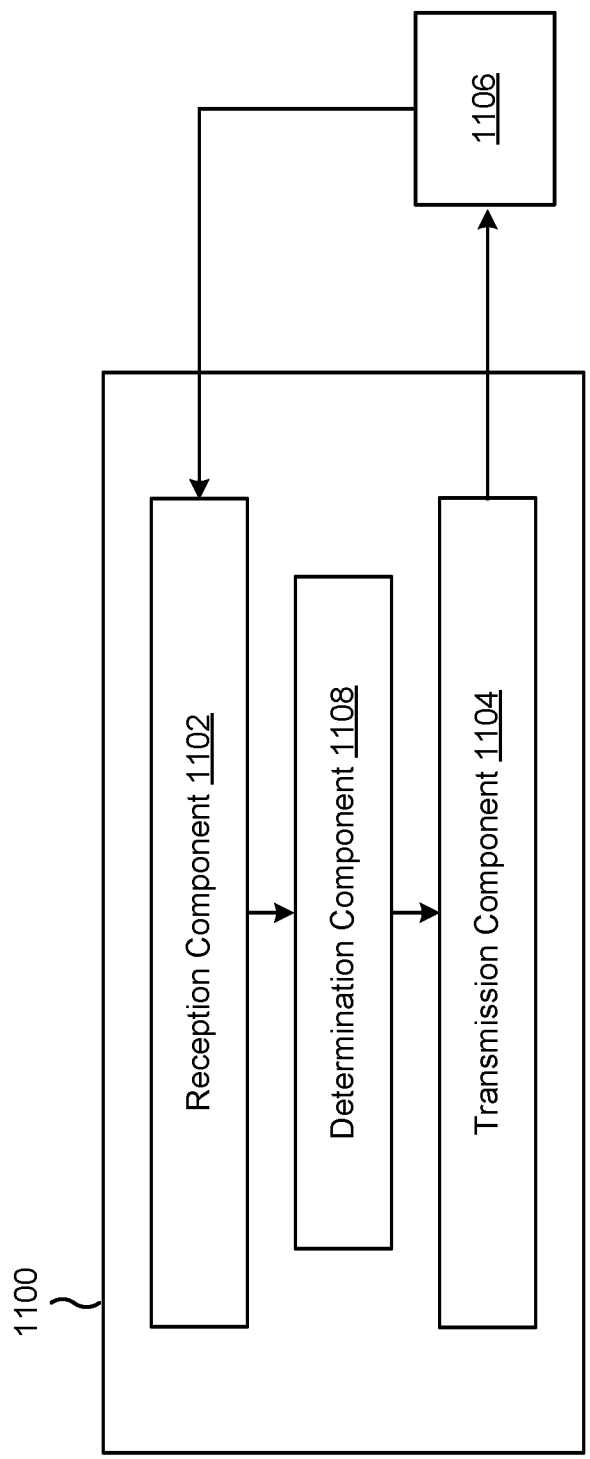
FIGS. 11-13 are block diagrams of example apparatuses for wireless communication, in accordance with the present disclosure.

FIG. 11 is a block diagram of an example apparatus 1100 for wireless communication. The apparatus 1100 may be a forwarding node, or a forwarding node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108. In some aspects, the determination component 1108 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

In some aspects, the apparatus 1100 may be configured to perform one or more operations described herein in connection with FIGS. 3-7. Additionally or alternatively, the apparatus 1100 may be configured to perform one or more processes described herein, such as process 800 of FIG. 8. In some aspects, the apparatus 1100 and/or one or more components shown in FIG. 11 may include one or more components of the forwarding node described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the forwarding node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the forwarding node described above in connection with FIG. 2. In some aspects, the transmission component 1104 may be co-located with the reception component 1102 in a transceiver.

The reception component 1102 may receive, from a first wireless communication device and during a receipt occasion, an unscheduled communication for forwarding to a second wireless communication device or a control node. The determination component 1108 may determine that the apparatus 1100 received the unscheduled communication during the receipt occasion. The transmission component 1104 may transmit, to the second wireless communication device or the control node and based at least in part on receiving the unscheduled communication during the receipt occasion, an indication of receipt of the unscheduled communication.

The transmission component 1104 may transmit, to the second wireless communication device or the control node, a regeneration of the unscheduled communication.

The transmission component 1104 may transmit, to the second wireless communication device or the control node, a communication that is based at least in part on the unscheduled communication.

The reception component 1102 may receive, from one or more additional wireless communication devices and during one or more additional receipt occasions, one or more additional unscheduled communications for forwarding to the second wireless communication device.

The transmission component 1104 may transmit, to the second wireless communication device or the control node, regenerations of the unscheduled communication and the one or more additional unscheduled communications or one or more communications that are based at least in part on the unscheduled communication and the one or more additional unscheduled communications.

The reception component 1102 may receive a new resource grant, an indication to modify a configuration of a configured resource grant, or an indication to modify a transmission configuration based at least in part on transmission of the indication of receipt of the unscheduled communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
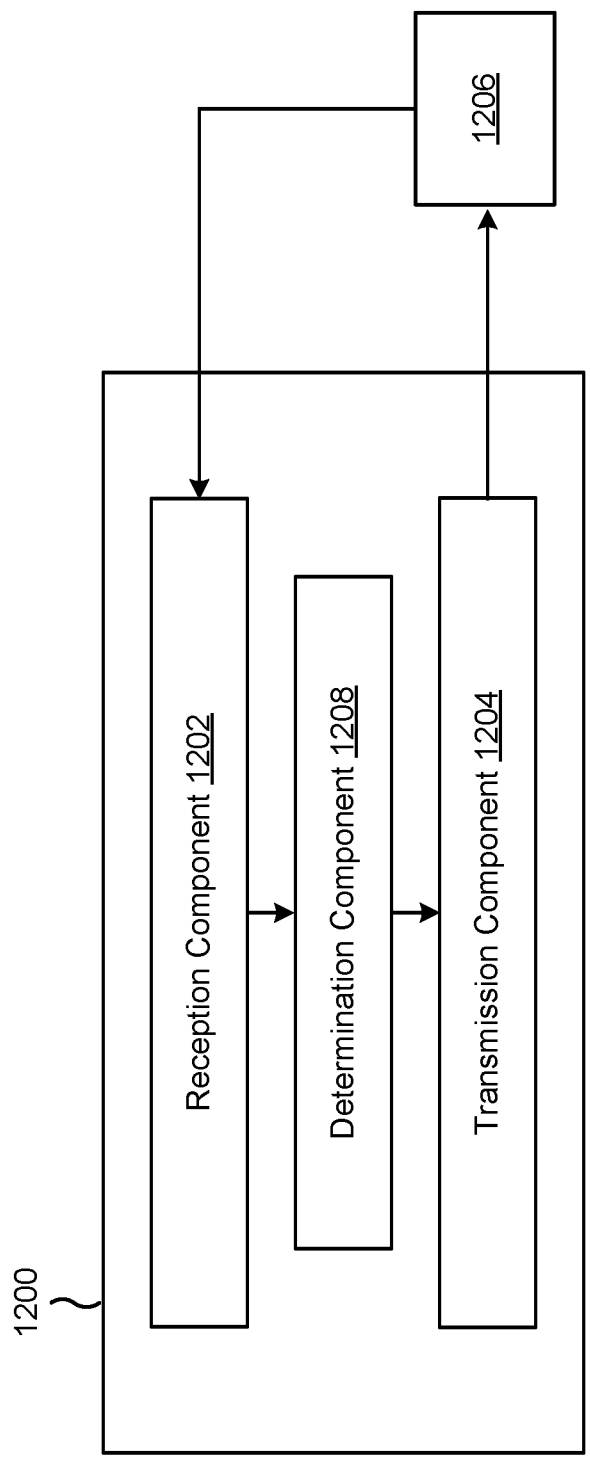

FIG. 12 is a block diagram of an example apparatus 1200 for wireless communication. The apparatus 1200 may be a control node, or a control node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208. In some aspects, the determination component 1208 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

In some aspects, the apparatus 1200 may be configured to perform one or more operations described herein in connection with FIGS. 3-7. Additionally or alternatively, the apparatus 1200 may be configured to perform one or more processes described herein, such as process 900 of FIG. 9. In some aspects, the apparatus 1200 and/or one or more components shown in FIG. 12 may include one or more components of the control node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the control node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the control node described above in connection with FIG. 2. In some aspects, the transmission component 1204 may be co-located with the reception component 1202 in a transceiver.

The reception component 1202 may receive, from a forwarding node, an indication of receipt of an unscheduled communication from a first wireless communication device, the unscheduled communication for forwarding to a second wireless communication device or the control node. The determination component 1208 may determine a configuration for forwarding the unscheduled communication to the second wireless communication device. The transmission component 1204 may transmit, to the forwarding node, the configuration for forwarding the unscheduled communication to the second wireless communication device or the control node.

The transmission component 1204 may transmit, to the second wireless communication device, a configuration for reception of the unscheduled communication from the forwarding node.

The reception component 1202 may receive, from the forwarding node, a regeneration of the unscheduled communication.

The reception component 1202 may receive, from the forwarding node, a communication that is based at least in part on the unscheduled communication.

The transmission component 1204 may transmit, to the forwarding node and based at least in part on reception of the indication of receipt of the unscheduled communication, one or more of a new resource grant, an indication to modify a configuration of a configured resource grant, or an indication to modify a transmission configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
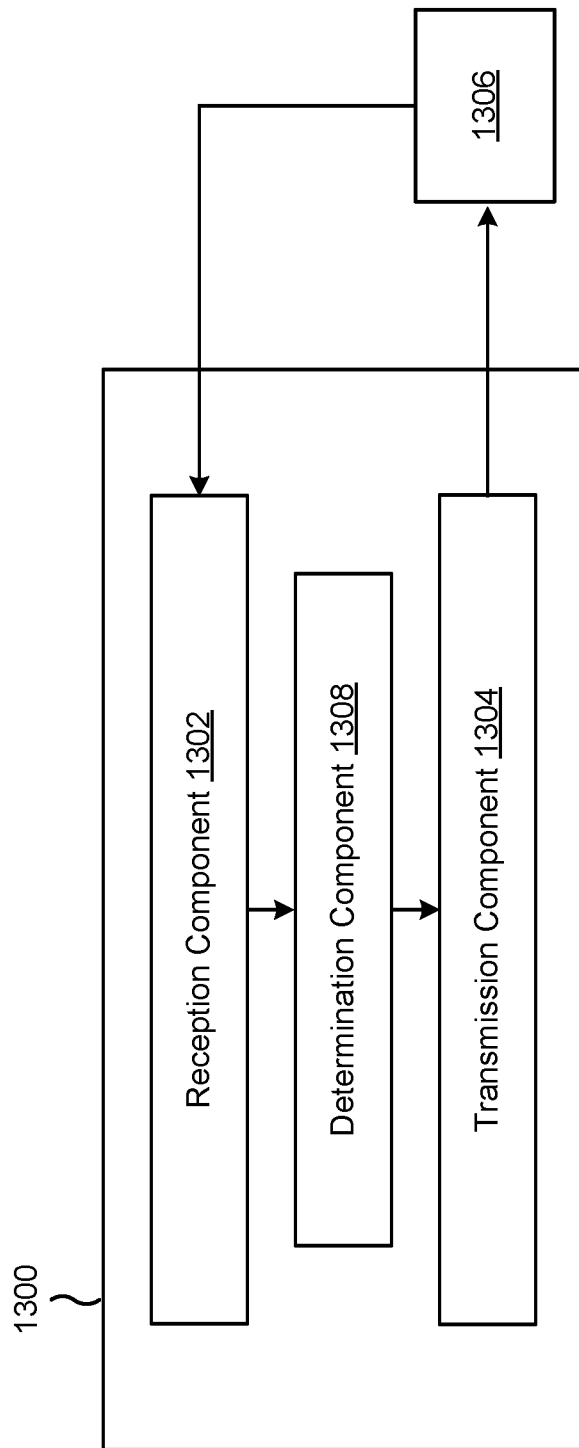

FIG. 13 is a block diagram of an example apparatus 1300 for wireless communication. The apparatus 1300 may be a wireless communication device, or a wireless communication device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308. In some aspects, the determination component 1308 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

In some aspects, the apparatus 1300 may be configured to perform one or more operations described herein in connection with FIGS. 3-7. Additionally or alternatively, the apparatus 1300 may be configured to perform one or more processes described herein, such as process 1000 of FIG. 10. In some aspects, the apparatus 1300 and/or one or more components shown in FIG. 13 may include one or more components of the wireless communication device described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the wireless communication device described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the wireless communication device described above in connection with FIG. 2. In some aspects, the transmission component 1304 may be co-located with the reception component 1302 in a transceiver.

The reception component 1302 may receive, from a control node, a configuration for reception of an unscheduled communication from a forwarding node. The determination component 1308 may determine a configuration of the apparatus for reception of the unscheduled communication from the forwarding node. The reception component 1302 may receive, from the forwarding node, the unscheduled communication.

The reception component 1302 may receive, from the forwarding node, a regeneration of the unscheduled communication.

The reception component 1302 may receive, from the forwarding node, a communication that is based at least in part on the unscheduled communication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a forwarding node, comprising: receiving, from a first wireless communication device and during a receipt occasion, an unscheduled communication for forwarding to a second wireless communication device or a control node; and transmitting, to the second wireless communication device or the control node and based at least in part on receiving the unscheduled communication during the receipt occasion, an indication of receipt of the unscheduled communication.

Aspect 2: The method of Aspect 1, further comprising: transmitting, to the second wireless communication device or the control node, a regeneration of the unscheduled communication, or transmitting, to the second wireless communication device or the control node, a communication that is based at least in part on the unscheduled communication.

Aspect 3: The method of any of Aspects 1-2, further comprising: receiving, from one or more additional wireless communication devices and during one or more additional receipt occasions, one or more additional unscheduled communications for forwarding to the second wireless communication device; and transmitting, to the second wireless communication device or the control node, regenerations of the unscheduled communication and the one or more additional unscheduled communications or one or more communications that are based at least in part on the unscheduled communication and the one or more additional unscheduled communications.

Aspect 4: The method of any of Aspects 1-3, further comprising: receiving a new resource grant, an indication to modify a configuration of a configured resource grant, or an indication to modify a transmission configuration based at least in part on transmission of the indication of receipt of the unscheduled communication.

Aspect 5: The method of any of Aspects 1-4, wherein transmission of the indication of receipt of the unscheduled communication comprises one or more of: transmission of the indication of receipt of the unscheduled communication via one or more resources associated with multiple receipt occasions, or transmission of the indication of receipt of the unscheduled communication via one or more resources of a configured grant.

Aspect 6: The method of any of Aspects 1-5, wherein the indication of receipt of the unscheduled communication comprises one or more of: a scheduling request, an indication of a number of receipt occasions on which the forwarding node received unscheduled communications including the unscheduled communication, an indication of one or more parameters associated with monitoring the receipt occasion, a measurement report, or a detection report.

Aspect 7: The method of any of Aspects 1-6, wherein the unscheduled communication comprises: a scheduling request, a configured grant communication, a control channel communication, a paging communication, or a random access channel communication.

Aspect 8: The method of any of Aspects 1-7, wherein reception of the unscheduled communication comprises: monitoring the receipt occasion to determine whether the first wireless communication device transmitted the unscheduled communication.

Aspect 9: The method of any of Aspects 1-8, wherein one or more of: the forwarding node comprises a repeater node or a relay node, the second wireless communication device comprises a base station, an integrated access backhaul node, or a UE, or the control node comprises the second wireless communication device.

Aspect 10: A method of wireless communication performed by a control node, comprising: receiving, from a forwarding node, an indication of receipt of an unscheduled communication from a first wireless communication device, the unscheduled communication for forwarding to a second wireless communication device or the control node; and transmitting, to the forwarding node, a configuration for forwarding the unscheduled communication to the second wireless communication device or the control node.

Aspect 11: The method of Aspect 10, further comprising: transmitting, to the second wireless communication device, a configuration for reception of the unscheduled communication from the forwarding node.

Aspect 12: The method of Aspect 11, wherein the configuration for reception of the unscheduled communication from the forwarding node comprises one or more of: an indication to receive the unscheduled communication via an indicated resource, or an indication to receive the unscheduled communication via a configured resource.

Aspect 13: The method of any of Aspects 10-12, further comprising: receiving, from the forwarding node, a regeneration of the unscheduled communication, or receiving, from the forwarding node, a communication that is based at least in part on the unscheduled communication.

Aspect 14: The method of any of Aspects 10-13, further comprising one or more of: receiving, from the forwarding node, regenerations of the unscheduled communication and one or more additional unscheduled communications; or receiving one or more communications that are based at least in part on the unscheduled communication and the one or more additional unscheduled communications.

Aspect 15: The method of any of Aspects 10-14, further comprising: transmitting, to the forwarding node and based at least in part on reception of the indication of receipt of the unscheduled communication, one or more of: a new resource grant, an indication to modify a configuration of a configured resource grant, or an indication to modify a transmission configuration.

Aspect 16: The method of any of Aspects 10-15, wherein reception of the indication of receipt of the unscheduled communication comprises one or more of: reception of the indication of receipt of the unscheduled communication via one or more resources associated with multiple receipt occasions, or reception of the indication of receipt of the unscheduled communication via one or more resources of a configured grant.

Aspect 17: The method of any of Aspects 10-16, wherein the indication of receipt of the unscheduled communication comprises one or more of: a scheduling request, an indication of a number of receipt occasions on which the forwarding node received unscheduled communications including the unscheduled communication, or an indication of one or more parameters associated with the forwarding node monitoring a receipt occasion associated with the unscheduled communication.

Aspect 18: The method of any of Aspects 10-17, wherein the unscheduled communication comprises: a scheduling request, a configured grant communication, a control channel communication, a paging communication, or a random access channel communication.

Aspect 19: The method of any of Aspects 10-18, wherein one or more of: the forwarding node comprises a repeater node or a relay node, the second wireless communication device comprises a base station, an integrated access backhaul node, or a UE, or the control node comprises the second wireless communication device.

Aspect 20: A method of wireless communication performed by a wireless communication device, comprising: receiving, from a control node, a configuration for reception of an unscheduled communication from a forwarding node; and receiving, from the forwarding node, the unscheduled communication.

Aspect 21: The method of Aspect 20, wherein the configuration for reception of the unscheduled communication from the forwarding node comprises one or more of: an indication to receive the unscheduled communication via an indicated resource, or an indication to receive the unscheduled communication via a configured resource.

Aspect 22: The method of any of Aspects 20-21, further comprising: receiving, from the forwarding node, a regeneration of the unscheduled communication, or receiving, from the forwarding node, a communication that is based at least in part on the unscheduled communication.

Aspect 23: The method of any of Aspects 20-22, further comprising one or more of: receiving, from the forwarding node, regenerations of the unscheduled communication and one or more additional unscheduled communications; or receiving one or more communications that are based at least in part on the unscheduled communication and the one or more additional unscheduled communications.

Aspect 24: The method of any of Aspects 20-23, wherein the unscheduled communication comprises: a scheduling request, a configured grant communication, a control channel communication, a paging communication, or a random access channel communication.

Aspect 25: The method of any of Aspects 20-24, wherein one or more of: the forwarding node comprises a repeater node or a relay node, the wireless communication the second wireless communication device comprises a base station, an integrated access backhaul node, or a UE, or the control node comprises a base station or an integrated access backhaul node.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a forwarding node, comprising:
receiving, from a first wireless communication device and during a receipt occasion, an unscheduled communication for forwarding to a second wireless communication device or a control node, wherein the unscheduled communication is a communication about whose transmission the forwarding node is not aware, and
wherein the forwarding node determines whether the forwarding node has received the unscheduled communication using a signal quality of a signal associated with the unscheduled communication; and
transmitting an indication of receipt of the unscheduled communication to the second wireless communication device or the control node in association with determining that the forwarding node has received the unscheduled communication during the receipt occasion.

2. The method of claim 1, further comprising:
transmitting, to the second wireless communication device or the control node, a regeneration of the unscheduled communication, or
transmitting, to the second wireless communication device or the control node, a communication that is based at least in part on the unscheduled communication.

3. The method of claim 1, further comprising:
receiving, from one or more additional wireless communication devices and during one or more additional receipt occasions, one or more additional unscheduled communications for forwarding to the second wireless communication device; and
transmitting, to the second wireless communication device or the control node, regenerations of the unscheduled communication and the one or more additional unscheduled communications or one or more communications that are based at least in part on the unscheduled communication and the one or more additional unscheduled communications.

4. The method of claim 1, further comprising:
receiving a new resource grant, an indication to modify a configuration of a configured resource grant, or an indication to modify a transmission configuration based at least in part on transmission of the indication of receipt of the unscheduled communication.

5. The method of claim 1, wherein transmission of the indication of receipt of the unscheduled communication comprises one or more of:
transmission of the indication of receipt of the unscheduled communication via one or more resources associated with multiple receipt occasions, or
transmission of the indication of receipt of the unscheduled communication via one or more resources of a configured grant.

6. The method of claim 1, wherein the indication of receipt of the unscheduled communication comprises one or more of:
a scheduling request,
an indication of a number of receipt occasions on which the forwarding node received unscheduled communications including the unscheduled communication,
an indication of one or more parameters associated with monitoring the receipt occasion,
a measurement report, or
a detection report.

7. The method of claim 1, wherein the unscheduled communication comprises:
a scheduling request,
a configured grant communication,
a control channel communication,
a paging communication, or
a random access channel communication.

8. The method of claim 1, wherein reception of the unscheduled communication comprises:
monitoring the receipt occasion to determine whether the first wireless communication device transmitted the unscheduled communication.

9. The method of claim 1, wherein one or more of:
the forwarding node comprises a repeater node or a relay node,
the second wireless communication device comprises a base station, an integrated access backhaul node, or a user equipment (UE).

10. A forwarding node for wireless communication, comprising:
one or more memories; and
one or more processors, coupled to the one or more memories, configured to:
receive, from a first wireless communication device and during a receipt occasion, an unscheduled communication for forwarding to a second wireless communication device or a control node,
wherein the unscheduled communication is a communication about whose transmission the forwarding node is not aware, and
wherein the forwarding node determines whether the forwarding node has received the unscheduled communication using a signal quality of a signal associated with the unscheduled communication; and
transmit an indication of receipt of the unscheduled communication to the second wireless communication device or the control node in association with determining that the forwarding node has received the unscheduled communication during the receipt occasion.

11. The forwarding node of claim 10, wherein the one or more processors are further configured to:
transmit, to the second wireless communication device or the control node, a regeneration of the unscheduled communication, or
transmit, to the second wireless communication device or the control node, a communication that is based at least in part on the unscheduled communication.

12. The forwarding node of claim 10, wherein the one or more processors are further configured to:
receive, from one or more additional wireless communication devices and during one or more additional receipt occasions, one or more additional unscheduled communications for forwarding to the second wireless communication device; and
transmit, to the second wireless communication device or the control node, regenerations of the unscheduled communication and the one or more additional unscheduled communications or one or more communications that are based at least in part on the unscheduled communication and the one or more additional unscheduled communications.

13. The forwarding node of claim 10, wherein the one or more processors are further configured to:
receive a new resource grant, an indication to modify a configuration of a configured resource grant, or an indication to modify a transmission configuration based at least in part on transmission of the indication of receipt of the unscheduled communication.

14. The forwarding node of claim 10, wherein transmission of the indication of receipt of the unscheduled communication comprises one or more of:

transmission of the indication of receipt of the unscheduled communication via one or more resources associated with multiple receipt occasions, or transmission of the indication of receipt of the unscheduled communication via one or more resources of a configured grant.

15. The forwarding node of claim 10, wherein the indication of receipt of the unscheduled communication comprises one or more of:
a scheduling request,
an indication of a number of receipt occasions on which the forwarding node received unscheduled communications including the unscheduled communication,
an indication of one or more parameters associated with monitoring the receipt occasion,
a measurement report, or
a detection report.

16. The forwarding node of claim 10, wherein the unscheduled communication comprises:
a scheduling request,
a configured grant communication,
a control channel communication,
a paging communication, or
a random access channel communication.

17. The forwarding node of claim 10, wherein reception of the unscheduled communication comprises:
monitor the receipt occasion to determine whether the first wireless communication device transmitted the unscheduled communication.

18. The forwarding node of claim 10, wherein one or more of:
the forwarding node comprises a repeater node or a relay node,
the second wireless communication device comprises a base station, an integrated access backhaul node, or a user equipment (UE), or
the control node comprises the second wireless communication device.

19. A non-transitory computer-readable medium storing a set of instructions for wireless communication, the set of instructions comprising:
one or more instructions that, when executed by one or more processors of a forwarding node, cause the forwarding node to:
receive, from a first wireless communication device and during a receipt occasion, an unscheduled communication for forwarding to a second wireless communication device or a control node,
wherein the unscheduled communication is a communication about whose transmission the forwarding node is not aware, and
wherein the forwarding node determines whether the forwarding node has received the unscheduled communication using a signal quality of a signal associated with the unscheduled communication; and
transmit an indication of receipt of the unscheduled communication to the second wireless communication device or the control node in association with determining that the forwarding node has received the unscheduled communication during the receipt occasion.

20. The non-transitory computer-readable medium of claim 19, wherein the one or more instructions further cause the forwarding node to:

transmit, to the second wireless communication device or the control node, a regeneration of the unscheduled communication, or
transmit, to the second wireless communication device or the control node, a communication that is based at least in part on the unscheduled communication.

21. The non-transitory computer-readable medium of claim 19, wherein the one or more instructions further cause the forwarding node to:
receive, from one or more additional wireless communication devices and during one or more additional receipt occasions, one or more additional unscheduled communications for forwarding to the second wireless communication device; and
transmit, to the second wireless communication device or the control node, regenerations of the unscheduled communication and the one or more additional unscheduled communications or one or more communications that are based at least in part on the unscheduled communication and the one or more additional unscheduled communications.

22. The non-transitory computer-readable medium of claim 19, wherein the one or more instructions further cause the forwarding node to:
receive a new resource grant, an indication to modify a configuration of a configured resource grant, or an indication to modify a transmission configuration based at least in part on transmission of the indication of receipt of the unscheduled communication.

23. The non-transitory computer-readable medium of claim 19, wherein transmission of the indication of receipt of the unscheduled communication comprises one or more of:
transmission of the indication of receipt of the unscheduled communication via one or more resources associated with multiple receipt occasions, or
transmission of the indication of receipt of the unscheduled communication via one or more resources of a configured grant.

24. The non-transitory computer-readable medium of claim 19, wherein the indication of receipt of the unscheduled communication comprises one or more of:
a scheduling request,
an indication of a number of receipt occasions on which the forwarding node received unscheduled communications including the unscheduled communication,
an indication of one or more parameters associated with monitoring the receipt occasion,
a measurement report, or
a detection report.

25. An apparatus for wireless communication at a forwarding node, comprising:
means for receiving, from a first wireless communication device and during a receipt occasion, an unscheduled communication for forwarding to a second wireless communication device or a control node,
wherein the unscheduled communication is a communication about whose transmission the forwarding node is not aware, and
wherein the forwarding node determines whether the forwarding node has received the unscheduled communication using a signal quality of a signal associated with the unscheduled communication; and
means for transmitting an indication of receipt of the unscheduled communication to the second wireless communication device or the control node in association with determining that the forwarding node has received the unscheduled communication during the receipt occasion.

26. The apparatus of claim 25, further comprising:
means for transmitting, to the second wireless communication device or the control node, a regeneration of the unscheduled communication, or
means for transmitting, to the second wireless communication device or the control node, a communication that is based at least in part on the unscheduled communication.

27. The apparatus of claim 25, further comprising:
means for receiving, from one or more additional wireless communication devices and during one or more additional receipt occasions, one or more additional unscheduled communications for forwarding to the second wireless communication device; and
means for transmitting, to the second wireless communication device or the control node, regenerations of the unscheduled communication and the one or more additional unscheduled communications or one or more communications that are based at least in part on the unscheduled communication and the one or more additional unscheduled communications.

28. The apparatus of claim 25, further comprising:
means for receiving a new resource grant, an indication to modify a configuration of a configured resource grant, or an indication to modify a transmission configuration based at least in part on transmission of the indication of receipt of the unscheduled communication.

29. The apparatus of claim 25, wherein transmission of the indication of receipt of the unscheduled communication comprises one or more of:
transmission of the indication of receipt of the unscheduled communication via one or more resources associated with multiple receipt occasions, or
transmission of the indication of receipt of the unscheduled communication via one or more resources of a configured grant.

30. The apparatus of claim 25, wherein the indication of receipt of the unscheduled communication comprises one or more of:
a scheduling request,
an indication of a number of receipt occasions on which the apparatus received unscheduled communications including the unscheduled communication,
an indication of one or more parameters associated with monitoring the receipt occasion,
a measurement report, or
a detection report.

* * * * *